United States Patent [19]

Aoki et al.

[11] Patent Number: 5,020,391

[45] Date of Patent: Jun. 4, 1991

[54] APPARATUS FOR CONTROLLING GEARSHIFTS IN AUTOMATIC TRANSMISSION USING THROTTLE AND ENGINE SPEED MAP SCHEDULE

[75] Inventors: Takashi Aoki; Satoshi Terayama; Yoshihisa Iwaki; Shigeo Ozawa; Toshitaka Imai; Takamichi Shimada, all of Saitama, Japan

[73] Assignee: Honda Giken Kogyo Kabushiki Kaisha, Tokyo, Japan

[21] Appl. No.: 389,765

[22] Filed: Aug. 4, 1989

[30] Foreign Application Priority Data

Aug. 6, 1988 [JP] Japan .................. 63-196656
Aug. 6, 1988 [JP] Japan .................. 63-196658
Aug. 6, 1988 [JP] Japan .................. 63-196660

[51] Int. Cl.$^5$ .................. F16H 59/14; F16H 59/46; F16H 59/74
[52] U.S. Cl. .................. 74/866
[58] Field of Search .................. 74/335, 336 R, 858, 74/866

[56] References Cited

U.S. PATENT DOCUMENTS

| | | | |
|---|---|---|---|
| 4,506,563 | 3/1985 | Hiramatsu | 74/866 X |
| 4,627,312 | 12/1986 | Fujieda et al. | 74/866 |
| 4,653,351 | 3/1987 | Downs et al. | 74/866 |
| 4,727,472 | 2/1988 | Deutsch | 74/866 X |
| 4,817,470 | 4/1989 | Müller et al. | 74/866 |
| 4,875,391 | 10/1989 | Leising et al. | 74/866 |
| 4,893,526 | 1/1990 | Tokoro | 74/866 |
| 4,922,624 | 5/1990 | Hiramatsu | 74/866 X |

FOREIGN PATENT DOCUMENTS 60-211152 10/1985 Japan .................. 74/869
61-189354 8/1986 Japan .................. 74/869

Primary Examiner—Allan D. Herrmann
Assistant Examiner—Khoi Q. Ta
Attorney, Agent, or Firm—Lyon & Lyon

[57] ABSTRACT

If the accelerator pedal condition is a power-on condition and the gearshift type is an upshift, or the accelerator pedal condition is a power-off condition and the gearshift type is a downshift, then a torque for engaging the next-gear-position gearshift means is established based on the engine torque to be transmitted from the engine to the next-gear-position gearshift means, and an inertia torque required to make the rotational speed of the input member of the next-gear-position gearshift means vary as desired with respect to the gearshift. If the accelerator pedal condition is a power-on condition and the gearshift type is a downshift, or the accelerator pedal condition is a power-off condition and the gearshift is an upshift, then the ratio between the rotational speeds of the input and output members of the next-gear-position gearshift means is detected. The torque for engaging the next-gear-position gearshift means is lowered after the gearshift is started until the detected rotational speed ratio reaches a predetermined value. After the detected rotational speed ratio has reached the predetermined value, the engaging torque is set to a vaslue large enough to engage the gearshift means.

14 Claims, 18 Drawing Sheets

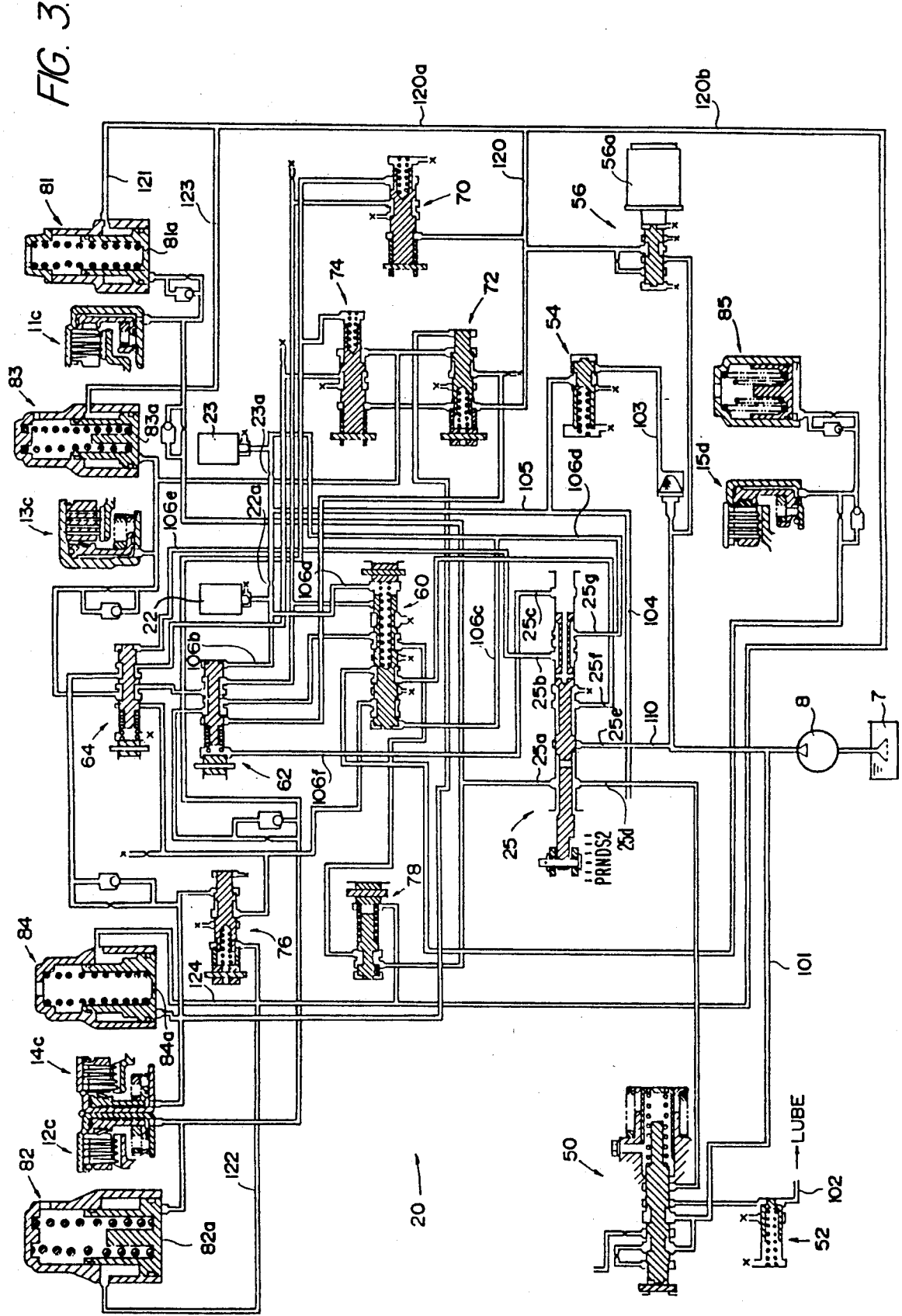

APPARATUS FOR CONTROLLING GEARSHIFTS IN AUTOMATIC TRANSMISSION USING THROTTLE AND ENGINE SPEED MAP SCHEDULE

BACKGROUND OF THE INVENTION

The present invention relates to a vehicular automatic transmission for automatically shifting gears by changing power transmission paths through engagement and disengagement of gear shift means (e.g., hydraulically operated clutches).

Automatic transmissions are arranged to shift gears automatically depending on running conditions of a motor vehicle to achieve desired vehicle running characteristics. It is customary to provide a gearshift map composed of upshifting and downshifting curves for each gear position, the curves being established in relation to the vehicle speed and the engine power output, and to control the automatic transmission to shift the gears according to the gearshift map dependent on the running conditions as indicated on the gearshift map. One example of such gear shifting control is disclosed in Japanese Laid-Open Patent Publication No. 61-189354, for example.

One type of automatic transmission includes a power transmission means comprising a plurality of power transmission paths (e.g., a plurality of gear trains), a plurality of gearshift means (e.g., a plurality of hydraulically operated clutches) for selecting the power transmission paths, and a control means (e.g., a hydraulic pressure control valve) for controlling operation of the gearshift means. When a running condition of a motor vehicle, as indicated on a gearshift map, moves across an upshifting or downshifting curve, a gearshift command is produced to effect an upshift or downshift, and a solenoid valve is operated based on the gearshift command to control operation of the hydraulic pressure control valve to engage one of the hydraulically operated clutches. The power transmission path through a certain gear train associated with the engaged clutch is now selected to effect a gearshift.

The speed reduction ratio (gear ratio) of a previous gear position (i.e., a gear position provided by the power transmission path (gear train) selected until a gearshift command is issued) is different from the speed reduction ratio of a next gear position (i.e., a gear position provided by the power transmission path selected by the gearshift command). Therefore, when such a gearshift is effected, it is necessary that the automatic transmission be controlled so as not to produce a gearshift shock and a gearshift delay.

It is also proposed to connect an accumulator to the hydraulically operated clutch to allow the engaging clutch torque for the next gear position to vary gradually for smooth engagement of the next-gear-position clutch, or to release the hydraulic pressure from the previous-gear-position clutch depending on a hydraulic pressure buildup in the next-gear-position clutch, or to control the hydraulic pressure to be supplied to the clutch depending on the engine output power (see Japanese Laid-Open Patent Publication No. 60-211152, for example).

An automotive automatic transmission effects various gearshifts, and the torque required to engage gearshift means differs from gearshift to gearshift. It is difficult to obtain desired gearshift characteristics for all gearshifts through the control using the accumulator, the orifice control valve, or the like, or the control of the clutch hydraulic pressure depending on the engine output power.

There are known gearshifts in a power-on/downshift mode in which the accelerator pedal is depressed and the transmission is shifted down (corresponding to a kickdown). A gearshift in such a power-on/downshift mode is controlled as follows: When a gearshift command is generated, the previous-gear-position clutch (the clutch which has been engaged so far) is disengaged, and when the rotational speeds of the input and output members of the next-gear-position clutch (the clutch which will newly be engaged by the gearshift) are synchronized with each other, the next-gear-position clutch is engaged. According to such a gearshift control process, the gearshift can smoothly be effected since no inertial energy is transferred between the input and output members of the next-gear-position clutch when it is engaged. The clutches referred to above are gearshift means. The brake of a planetary transmission mechanism also corresponds to a gearshift means in an automatic transmission.

If, however, the time at which the input and output rotational speeds of the next-gear-position clutch are synchronized is detected by a timer or based on the relationship between the vehicle speed and the engine rotational speed, then the accuracy of detection is low because of the oil temperature, different characteristics of individual gearshift means, and slippage in the torque converter and fluid coupling. If the speed synchronizing time is detected in error, then the next-gear-position clutch may be engaged too early resulting in a gearshift shock, or may be engaged too late resulting engine racing or making the driver embarrassed.

In view of the above drawbacks, it has been proposed to detect the ratio of the rotational speed of an input rotatable member to the rotational speed of an output rotatable member of a hydraulically operated clutch (the ratio=output rotational speed/input rotational speed), and determine when the input and output rotational speeds are synchronized by detecting that the input and output rotational speed ratio becomes substantially 1.0 (Japanese Patent Application No. 63-50337). According to this proposal, when a gearshift is to be effected in the power-on/downshift mode, for example, a hydraulic pressure supplied to the next-gear-position clutch is kept at a level slightly lower than a hydraulic pressure to start engaging the clutch after the gearshift is started until the synchronization of the input and output rotational speeds is detected. After the synchronization of the input and output rotational speeds is detected, the hydraulic pressure supplied to the next is increased to a predetermined clutch engaging pressure.

The above gearshift control for the automatic transmission can considerably accurately detect the time when the input and output rotational speeds are synchronized since the input and output rotational speed ratio of the next-gear-position clutch is directly detected by detecting the rotational speeds of the input and output rotatable members thereof. If the speed synchronizing time is detected slightly in error or the timing at which the next-gear-position clutch starts to be engaged is slightly shifted, since the input and output rotational speed ratio varies sharply, such an error causes a gearshift shock or engine racing even if the error is small.

In view of the above problem, it may be proposed not to increase the hydraulic pressure directly to the clutch engaging pressure when the synchronized speeds are detected, but to set the hydraulic pressure to a level commensurate with the torque transmitted from the engine. With this arrangement, since the clutch is gradually engaged even if the clutch hydraulic pressure is increased slightly early, any gearshift shock produced is small and no engine racing takes place.

In the power-on/downshift mode, at least during an initial stage of a gearshift, the previous-gear-position clutch is disengaged and the next-gear-position clutch is not engaged and does not transmit any torque. Therefore, the engine is racing, and the engine torque detected at this time is of a low value. Accordingly, the above problem cannot be solved by setting the hydraulic pressure to a level commensurate with such an engine torque.

There are also known gearshifts in a power-off/upshift mode in which the accelerator pedal is released and the transmission is shifted up. A gearshift in such a power-off/upshift mode is controlled as follows: When a gearshift command is generated, the previous-gear-position clutch is disengaged, and when the rotational speeds of the input and output members of the next-gear-position clutch are synchronized with each other, the next-gear-position clutch is engaged. According to such a gearshift control process, the gearshift can smoothly be effected. However, because any clutches are not engaged after the gearshift is started until the next-gear-position clutch is engaged, if the accelerator pedal is depressed during such an interval of time, the throttle opening is increased and the engine rotational speed is also increased quickly, resulting in engine racing or a gearshift shock caused by such engine racing.

To avoid the above drawback, if the accelerator pedal is depressed after the gearshift is started, the hydraulic pressure supplied to the next-gear-position clutch may be increased to apply to the clutch an engaging torque that is commensurate with the torque transmitted from the engine, so that engine racing is suppressed and a gearshift shock is prevented. According to this control process, however, immediately before the accelerator pedal is depressed, any of the clutches are not engaged, and the engine torque detected at this time is a low value necessary to take up the inertia of rotating parts. Any hydraulic pressure established so as to be commensurate with such an engine torque is not effective to prevent the aforesaid problems such as engine racing.

If the hydraulic pressure is released slowly from the previous-gear-position clutch so that the disengagement of this clutch is delayed, the engagement of the next-gear-position clutch is also delay as much, with the result that a gearshift time lag may be generated. In the power-on/downshift and power-off/upshift modes, since any gearshift is effected by the driver operating on the accelerator pedal (i.e,. depressing or releasing the accelerator pedal), a gearshift is based on the intention of the driver. Accordingly, the above gearshift time lag is easily sensed by the driver, who then feels bad about the gear shifting operation of the transmission.

SUMMARY OF THE INVENTION

It is an object of the present invention to provide a transmission gearshift control apparatus capable of setting suitable forces for engaging gearshift means according to gearshift modes so that desired gearshift characteristics will be given to an automatic transmission.

Another object of the present invention is to provide a transmission gearshift control apparatus for controlling gearshifts well without gearshift shocks and engine racing irrespective of errors in detecting the synchronization of input and output rotational speeds of a next-gear-position gearshift means.

Still another object of the present invention is to provide a transmission gearshift control apparatus for smoothly effecting gearshifts without engine racing even when the accelerator pedal is depressed during the power-off/upshift mode.

Yet another object of the present invention is to provide a transmission gearshift control apparatus for effecting gearshifts without a time lag in the power-on/downshift and power-off/upshift modes in which the driver's feeling about the gear shifting operation of the transmission would otherwise tend to be impaired by a time lag.

To achieve the above objects, according to the preinvention, a plurality of gearshift modes are preset according to accelerator pedal conditions and gearshift types, and a force for engaging a gearshift means is established according to the gearshift modes for a gearshift. The accelerator pedal conditions include the condition of a depressed accelerator pedal and the condition of a released accelerator pedal. The condition in which the accelerator pedal is depressed to open the engine throttle valve is referred to as a power-on condition, and the condition in which the accelerator pedal is released to close the engine throttle valve is referred to as a power-off condition. The gearshift types include an upshift and a downshift.

If the accelerator pedal condition is a power-on condition and the gearshift type is an upshift, or the accelerator pedal condition is a power-off condition and the gearshift type is a downshift, then a torque for engaging the next-gear-position gearshift means is established based on the engine torque to be transmitted from the engine to the next-gear-position gearshift means, and an inertia torque required to make the rotational speed of the input member of the next-gear-position gearshift means vary as desired with respect to the gearshift. If the accelerator pedal condition is a power-on condition and the gearshift type is a downshift, or the accelerator pedal condition is a power-off condition and the gearshift type is an upshift, then the ratio between the rotational speeds of the input and output members of the next-gear-position gearshift means is detected. The torque for engaging the next-gear-position gearshift means is lowered after the gearshift is started until the detected rotational speed ratio reaches a predetermined value. After the detected rotational speed ratio has reached the predetermined value, the engaging torque is set to a value large enough to engage the gearshift means.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 is a circuit diagram of a hydraulic circuit for controlling gearshifts in the automatic transmission;

DESCRIPTION OF THE PREFERRED EMBODIMENTS

Figure 1:
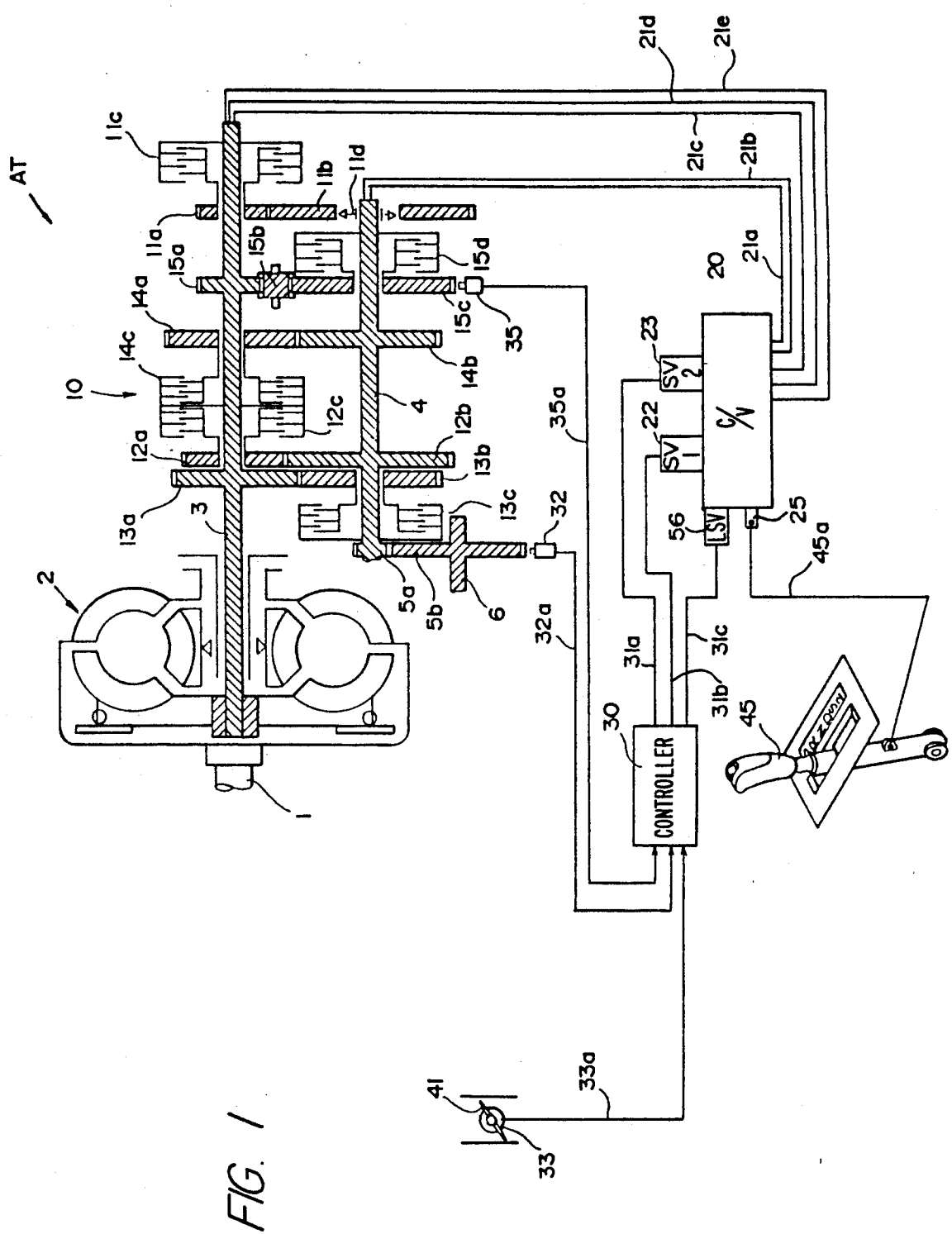
FIG. 1 is a schematic view of an automatic transmission controlled by a gearshift control apparatus according to the present invention.

FIG. 1 schematically shows an automatic transmission which is mounted on a motor vehicle and controlled by a transmission gearshift control apparatus, the automatic transmission having hydraulically operated clutches operable by hydraulic pressures determined by the transmission gearshift control apparatus. The automatic transmission, generally denoted at AT, has a transmission mechanism 10 comprising a plurality of gear trains for changing the speed of rotation of the engine power output transmitted from a torque converter 2 and for applying the engine power output to an output shaft 6. More specifically, the engine power output from the torque converter 2 is applied to an input shaft 3, and then transmitted, while its rotational speed is being changed, to a countershaft 4 extending parallel to the input shaft 3 through a selected one of five gear trains disposed parallel between the input shaft 3 and the countershaft 4. The engine power output is then applied from the countershaft 4 to the output shaft 6 through output gears 5a, 5b disposed between the countershaft 4 and the output shaft 6.

The five gear trains between the input shaft and the countershaft 4 include a gear train composed of gears 11a, 11b for a first gear position, a gear train composed of gears 12a, 12b for a second gear position, a gear train composed of gears 13a, 13b for a third gear position, a gear train composed of gears 14a, 14b for a fourth gear position, and a gear train composed of gears 15a, 15b, 15c for a reverse gear position. These gear trains are associated respectively with hydraulically operated clutches 11c, 12c, 13c, 14c, 15d for enabling the gear trains to transmit the engine power output from the input shaft 3 to the countershaft 4. A one-way clutch 11d is disposed in the gear 11b. By selectively operating the hydraulically operated clutches, one of the five gear trains is selected for engine power transmission while changing the rotational speed of the transmitted engine power output.

The five hydraulically operated clutches 11c through 15d are controlled in operation by a hydraulic pressure supplied and discharged through hydraulic pressure lines 21a through 21e from and to a hydraulic pressure control valve assembly 20.

The hydraulic pressure control valve assembly 20 is operated by a manual spool valve 25 coupled by a wire 45a to a shift lever 45 movable by the driver, two solenoid valves 22, 23, and a linear solenoid valve 56. The solenoid valves 22, 23 are selectively actuated and inactivated by operating signals supplied from a controller 30 through signal lines 31a, 31b. The linear solenoid valve 56 is operated by a signal supplied from the controller 30 via a signal line 31c. The controller 30 is supplied with a rotational speed signal fed via a signal line 35a from a first rotational speed sensor 35 which detects the rotational speed of an input member of the hydraulically operated clutch 15d based on rotation of the reverse gear 15c, a rotational speed signal fed via a signal line 32a from a second rotational speed sensor 32 which detects the rotational speed of an output member of the hydraulically operated clutch 13c based on rotation of the output gear 5b, and a throttle valve opening signal fed via a signal line 33a from a throttle valve opening sensor 33 which detects the opening of an engine throttle valve 41.

Operation to control gear shifting in the automatic transmission of the above construction will be described below.

Gear shifting control is performed dependent on a shift range selected by the manual valve 25 of the hydraulic pressure control valve assembly 20 in response to manual operation of the shift lever 45. Available shift ranges include shift ranges or positions P, R, N, D, S, 2, for example. In the ranges P and N, all the clutches 11c through 15d are disengaged and the transmission is in a neutral position. In the range R, the reverse-gear-position clutch 15d is engaged to select the reverse gear position. In the ranges D, S, and 2, gear positions are selected based on a gearshift map.

Figure 2:
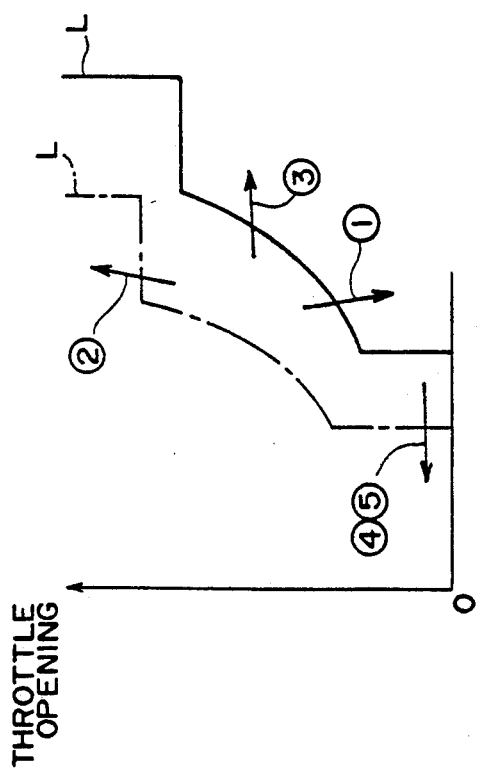
FIG. 2 is a graph illustrating a gearshift map used for gearshift control in the automatic transmission.

As shown in FIG. 2, the gearshift map is composed of an upshifting curve $L_U$ and a downshifting curve $L_D$, these curves being plotted in a graph having a vertical axis indicating the throttle valve opening $\theta_{TH}$ and a horizontal axis indicating the vehicle speed V. When a point on the gearshift map which represents the running condition of the motor vehicle as determined by the engine throttle valve opening and the vehicle speed moves to the right across the upshifting curve $L_U$, the transmission effects a gear upshift. When the point moves to the left across the downshifting curve $L_D$ after the upshift, the transmission effects a gear downshift.

The gearshifts thus effected by the gearshift control apparatus are grouped into the following five modes, which are represented by the corresponding numerals in FIG. 2:

(1) SYU mode: This is a mode in which an upshift is effected when the power is off (e.g., the gears are shifted up when the accelerator pedal is released while the vehicle is running);

(2) SYD mode: This is a mode in which a downshift is effected when the power is on (e.g., a kickdown);

(3) IPU mode: This is a mode in which an upshift is effected when the power is on (e.g., the gears are shifted up during acceleration);

(4) IPD mode: This is a mode in which a downshift is effected by operating the manual shift lever 45 while the power is offf (e.g., the gears are shifted down by moving the shift lever from the range D into the range S); and (5) EPD mode: This is a mode in which the vehicle speed is lowered to shift down the gears when the power is off (e.g., the accelerator pedal is released while the vehicle is running, and the gears are automaticall shifted down with the vehicle coasting and the vehicle speed lowered).

The IPD and EPD modes are the same as long as the accelerated condition and the gearshift type are concerned. However, the driver operates the shift lever to effect a downshift in the IPD mode whereas a downshift is automatically effected as the running condition varies in the EPD mode. Therefore, an allowable level of gearshift shock is relatively large in the IPD mode, but is small in the EPD mode. Some vehicles have D and S buttons associated with the automatic transmission, the D button being pressed to select slow gearshifts and the S button being pressed to select sporty gearshifts. If a power-off/downshift is effected by switching on and off these buttons, then it is appropriate to think that the driver does not operate these buttons with a view to effecting a downshift, and such a power-off/downshift is assumed to be caused in the EPD mode.

While the gear shift map of FIG. 2 is shown as having one upshifting curve and one downshifting curve, the gear shift map actually has a plurality of upshifting curves and a plurality of downshifting curves dependent on the number of gear positions available in the transmission.

When the running condition point in the gear shift map goes across the upshifting or downshifting curve, the controller 30 applies operating signals over the signal lines 31a, 31b to the solenoid valves 22, 23 to operate the hydraulic pressure control valve assembly 20 to supply hydraulic pressure to and discharge hydraulic pressure from the hydraulically operated clutches 11c through 11d for effecting an upshift or a downshift.

The hydraulic pressure control valve assembly 20 will be described below with reference to FIG. 3.

The control valve 20 delivers operating oil supplied from an oil sump 7 by a pump 8 to a regulator valve 50 via a line 101, and the pressure of the delivered operating oil is regulated into a predetermined line pressure by the regulator valve 50. The line pressure is applied via a line 110 to the manual spool valve 25 which then selectively supplies the line pressure to the gear position clutches 11c, 12c, 13c, 14c, 15d to control these clutches, dependent on operation of the manual spool valve 25 and various other valves in the control valve assembly 20 according to running conditions of the motor vehicle.

The various valves in the control valve assembly 20 will be described below. The control valve assembly 20 includes a check valve 52 disposed downstream of the regulator valve 50 for preventing the oil of lubricating oil supplied to various parts of the automatic transmission AT via a line 102 from rising beyond a predetermined pressure level. A modulator valve 54 reduces the line pressure fed from a line 103 to produce a prescribed modulator pressure. The modulator valve 54 then supplies working oil under the modulator pressure via a line 104 to a lockup clutch control circuit (not shown) of the torque converter 2 and also via a line 105 to the first and second solenoid valves 22, 23 for controlling operation of shift valves.

The manual spool valve 25 is operated in interlinked relation to the shift lever 45 that is manually moved by the driver. The manual valve 25 is selectively positioned in any one of six positions P, R, N, D, S, 2 for selectively supplying the line pressure from the line 110 to lines 25a through 25g.

When the manual valve 25 is in any one of the positions D, S, 2, a 1-2 shift valve 60, a 2-3 shift valve 62, and a 3-4 shift valve 64 are controlled by the modulator pressure supplied via lines 106a through 106f dependent on whether the first and second solenoid valves 22, 23 are turned on or off, for controlling the supply of the line pressure to and the discharge of the line pressure from the clutches 11c, 12c, 13c, 14c for the first through fourth gear positions, respectively.

The lines 106a, 106b are connected to the first solenoid valve 22 and also to the line 105 through an orifice 22a. When the solenoid of the first solenoid valve 22 is de-energized, its port leading to a drain is closed, and working oil under the modulator pressure is supplied from the line 105 to the lines 106a, 106b. When the solenoid of the first solenoid valve 22 is energized, the drain port thereof is opened to reduce the pressure in the lines 106a, 106b substantially to zero. The lines 106c through 106f are connected to the second solenoid valve 23 and also to the line 105 via an orifice 23a. When the solenoid of the second solenoid valve 23 is turned off, the drain port thereof is closed to allow the working oil under the modulator pressure to be supplied from the line 105 to the lines 106c through 106f. When the solenoid of the second solenoid valve 23 is turned on, the drain port thereof is opened to reduce the pressure in the lines 106c through 106f substantially to zero.

The line 106a is connected to the righthand end (as shown) of the 1-2 shift valve 60, the line 106b is connected to the righthand end of the 2-3 shift valve 62, the line 106c is connected to the lefthand end of the 1-2 shift valve 60, the line 106e is connected to the righthand end of the 3-4 shift valve 64, and the line 106f is connected to the lefthand end of the 2-3 shift valve 62. The lines 106e, 106f are coupled to the second solenoid valve 23 through the manual valve 25 and the line 106d. Therefore, by controlling the operation of the first and second solenoid valves 22, 23 to control the supply of the modulator pressure from the line 105 to the lines 106a through 106f, the operation of the 1-2, 2-3, and 3-4 shift valves 60, 62, 64 can be controlled to selectively supply the line pressure fed from the line 110 via the manual valve 25 to the hydraulically operated clutches 11c, 12c, 13c, 14c for selecting a desired gear position.

The control valve assembly 20 also has first, second, third, and fourth orifice control valves 70, 72, 74, 76 for releasing hydraulic pressure from the hydraulic pressure chamber in the clutch associated with a previous gear position in timed relation to the development of a pressure buildup in the hydraulic pressure chamber in the clutch associated with a next gear position, when a gear shift is effected. More specifically, the first orifice control valve 70 controls the timing of releasing the hydraulic pressure from the third-gear-position clutch when a downshift is effected from the third gear position to the second gear position. The second orifice control valve 72 controls the timing of releasing the hydraulic pressure from the second-gear-position clutch when an upshift is carried out from the second gear position to the third gear position or from the second gear position to the fourth gear position. The third orifice control valve 74 controls the timing of releasing the hydraulic pressure from the fourth-gear-position clutch upon a downshift from the fourth gear position to the third gear position or from the fourth gear position to the second gear position. The fourth orifice control valve 76 controls the timing of releasing the hydraulic pressure from the third-gear-position clutch at the time of an upshift from the third gear position to the fourth gear position.

The control valve assembly 20 further includes accumulators 81, 82, 83, 84 having pressure bearing chambers communicating respectively with the hydraulic pressure chambers of the hydraulically operated clutches 11c, 12c, 13c, 14c. The accumulators 81, 82, 83, 84 also have back pressure chambers opposite to the respective pressure bearing chambers with pistons 81a, 82a, 83a, 84a therebetween, the back pressure chambers being connected to respective lines 121, 122, 123, 124 which are coupled to the linear solenoid valve 56 via lines 120a, 120a and a line 120.

The linear solenoid valve 56 has a linear solenoid 56a. A current supplied to the linear solenoid 56a is controlled to control the operating force of the linear solenoid valve 56 for controlling the magnitude of a hydraulic pressure (control pressure $P_{TH}$) to be supplied to a line 120. B controlling the current supplied to the linear solenoid 56a, therefore, the hydraulic pressure in the back pressure chambers of the accumulators 81 through 84 can be controlled to control the hydraulic pressure in the hydraulic pressure chamber n an engaged clutch.

A clutch pressure control valve 78 is disposed in a line extending from the manual valve 25 to the 1-2 shift valve 60, and is operated under the control pressure $P_{TH}$ as regulated by the linear solenoid valve 56. The line pressure supplied through the shift valves 60, 62, 64 to the hydraulically operated clutches 11c, 12c, 13c, 14c is controlled by the clutch pressure control valve 78 depending on the control pressure $P_{TH}$. At times when no gearshifts are effected, the control pressure $P_{TH}$ is controlled so as to correspond to the engine output power, so that the line pressure for operating the clutches may be as low as possible, just enough to produce a necessary torque corresponding to the engine output power.

In the hydraulic pressure control valve assembly 20 thus constructed, the manual valve 25 is operated by the shift lever 45 and the solenoid valves 22, 23 are turned on and off to selectively supply the line pressure to the hydraulically operated clutches 11c, 12c, 13c, 14c for automatically selecting a gear position.

The manner in which an engaging torque for each of the clutches of the automatic transmission is determined will be described below.

Figure 4:
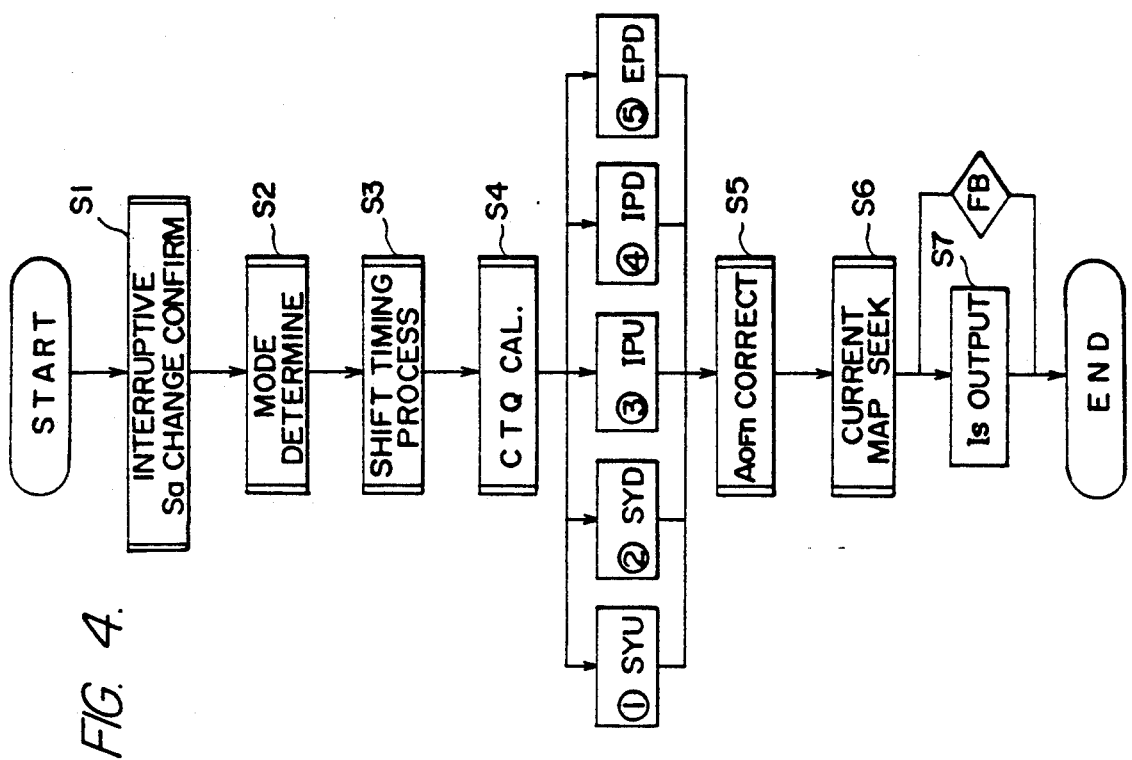
FIGS. 4 through 6 are flowcharts showing a control sequence for determining a clutch engaging torque according to the present invention.

FIG. 4 shows a main control sequence for determining a clutch engaging torque. First, a step S1 confirms an interrupt process at the time gearshift commands are successively applied in a short period of time, such as for shifting gears from 4th gear position to the third gear position to the second gear position, for example. Then, a step S2 determine those of the five shift modes shown in FIG. 2 to which the commanded gearshifts correspond. Then, a step S3 determines a timing for controlling the clutch engaging torque, a timing for retarding the engine output power, or the like in each of the shift modes.

Thereafter, a step S4 calculates the engaging torque CTQ for each of the clutches, and the clutch engaging torques for gearshifts is determined based on the timing determined in the step S3 in the respective shift modes. In order to produce the clutch engaging torque in each of the clutches, the control pressure $P_{TH}$ is controlled by the linear solenoid valve 56 to control the back pressure of each of the accumulators. At this time, the back pressure is corrected for the preload produced by a spring acting on the piston in each of the accumulators in a step S5 ($A_{OFn}$ correction). The back pressure is also corrected for a centrifugal hydraulic pressure which is developed in the hydraulic pressure chamber of each clutch when the clutch rotates.

After the desired engaging torque is determined and the control pressure $P_{TH}$ required to obtain the engaging torque is calculated, a necessary current Is to be supplied is sought from a map of linear solenoid currents and control pressures $P_{TH}$ in a step S6, and the current Is is supplied for feedback control in a step S7.

Figure 5:
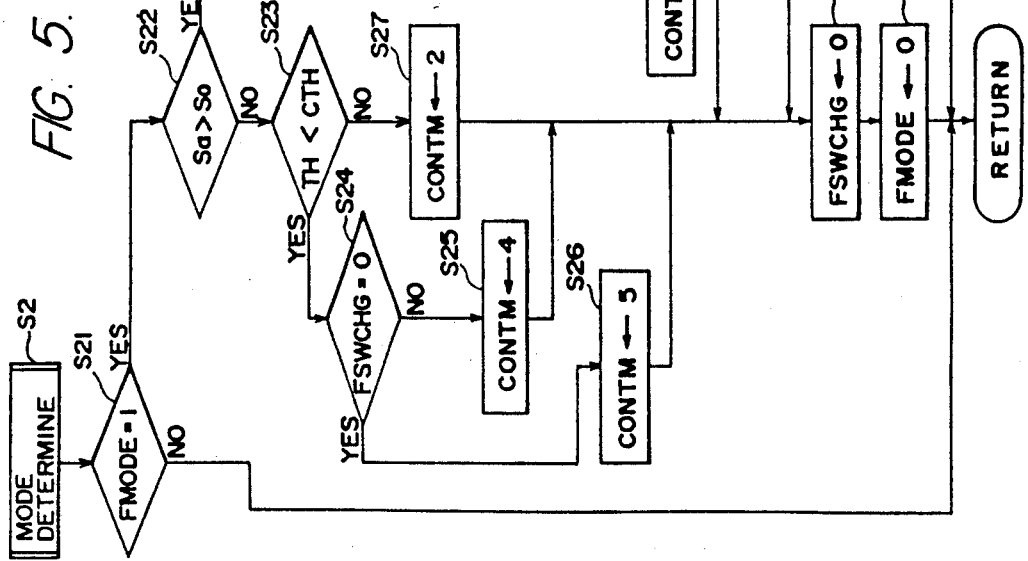

The determination of the mode in the step S42 in the above main control sequence will be described below with reference to the flowchart of FIG. 5.

A step S21 determines whether a mode flag FMODE, which is set when a shift mode should be determined after a gearshift command has been issued, is 1 or not. If FMODE=0, then the control sequence of FIG. 5 is brought to an end.

If FMODE=1, a step S22 determines whether a target gear position Sa is higher than a preset gear position So or not. If Sa>So, then the gearshift is an upshift, and control goes to a step S30. If Sa<So, then the gearshift is a downshift, and control goes to a step S23.

If the gearshift is a downshift, the step S23 determines whether a throttle opening TH is smaller than an accelerator pedal condition decision value CTH. If TH≧CTH, then the gearshift is a downshift in the power-on condition, and control goes to a step S27 in which a numeral "2" indicating this mode (SYD mode) is stored in CONTM. If TH<CTH, then the gearshift is a downshift in the power-off condition, i.e., in the power-off/downshift mode. Since this mode includes the IPD and EPD modes, a step S24 determines whether an inhibitor switch change flag FSWCHG, which is set to 1 when the manual shift lever is operated, is 0 or not. If FSWCHG=0, then the mode is as the EPD mode, and a numeral "5" indicating the EPD mode is stored in CONTM in a step S26. If FSWCHG=1, then the mode is the IPD mode, and a numeral "4" indicating this mode is stored in CONTM in a step S25.

If the gearshift is an upshift, the step S30 determines whether the flag FSWCHG=1 or not. If FSWCHG=1, control goes to a step S33 that determines whether a decision timer end flag $FT_{1e}$, which is set upon elapse of the time set by a decision timer $T_1$, is 1 or not. If the flag $FT_{1e}=0$ and the time is within the time set by the decision timer, then the mode flag FMODE is set to 1 in a step S34, and the control sequence is finished.

If FSWCHG=0 in the step S30, then a step 31 determines whether the rate of change DTHM of the throttle opening is smaller than an SYU threshold value DTHSY or not. If DTHM≧DTHSY, then the mode is determined as the power-on/upshift mode and the IPU mode, and a corresponding numeral "3" is stored in CONTM in a step S32.

If DTHM<DTHSY in the step S31, then control goes to a step S33 which determines whether the decision timer end flag $FT_{1e}=1$ or not. If $FT_{1e}=1$ and the time is within the time set by the decision timer, then the mode flag FMODE is set to 1 in the step S34 and the control sequence is brought to an end.

If $FT_{1e}=0$ in the step S33, then a step S35 compares the throttle opening TH and a prescribed decision opening CTHM. If TH<CTHM, the mode is determined as the power-off/upshift mode and the SYU mode, a corresponding numeral "1" is stored in CONTM in a step S36. If TH≧CTHM, then the mode is determined as the power-on/upshift mode and the IPU mode, a corresponding numeral "3" is stored in CONTM.

After any of the five modes has been determined, the inhibitor switch change flag FSWCHG and the mode flag FMODE are set to 0 in steps S28, S29, and then the control sequence is ended.

Figure 6:
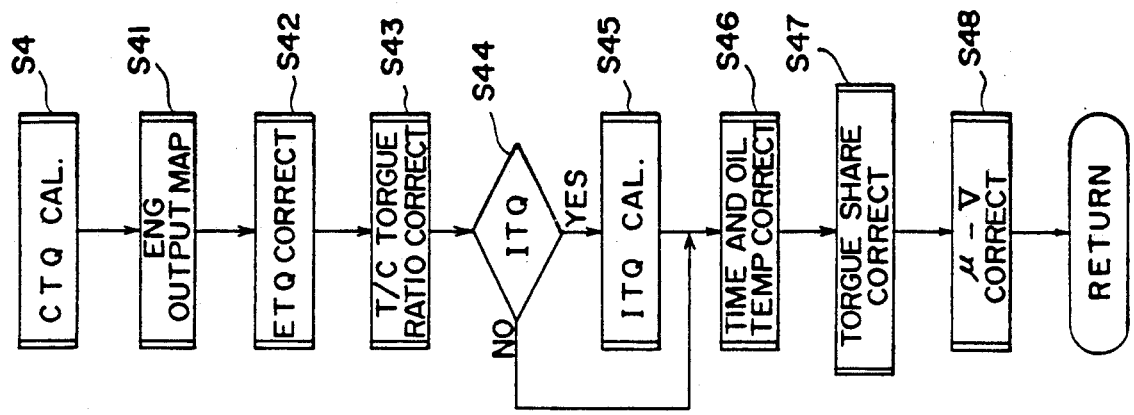

The calculation in the step S4 of the clutch engaging torque CTQ in the above main control sequence will be described below with reference to the flowchart of FIG. 6.

First, an engine output torque ETQ corresponding to the engine rotational speed and the intake vacuum at the time of a gearshift is read from a predetermined engine output map of engine rotational speeds Ne and intake vacuums $P_B$ in a step S41. Since the engine output power is retarded in order to effect a smooth gearshift, the engine output power is corrected to such an output retard in a step S42. Since the engine output power is transmitted to the automatic transmission through a torque converter, the engine output power is further corrected for a torque increase caused by the torque converter in a step S43.

After the engine torque ETQ to be transmitted to the input shaft of the transmission has thus been calculated and corrected as described above, it is determined whether the gearshift at this time is in an inertia torque requiring mode (specifically the IPU or IPD mode). If in the inertia torque requiring mode, then an inertia torque ITQ is calculated in a step S45.

The inertia torque ITQ is a torque required to rotate the inertia of the input member of the clutch which is engaged in the gearshift, depending on the rate of change of the engine rotational speed which is determined from the relationship between a change in the engine rotational speed caused by the gearshift and a desired gearshift time required for the gearshift. Thus, the inertia torque ITQ is calculated based on the engine rotational speed, the desired gearshift characteristics, and the input member inertia at the time of the gearshift.

If in the inertia torque requiring mode, the inertia torque ITQ calculated in the step S45 is added to the engine torque ETQ to determine a torque to be transmitted to the transmission input shaft.

After the transmission input shaft torque is determined for each gearshift mode, the torque is corrected for a hydraulic pressure buildup time and an oil temperature in a step S46 (DTQ correction). More specifically, even if the hydraulic pressure is supplied to the clutch at the time of starting to effect a gearshift, there is a time delay before the oil reaches the hydraulic pressure chamber of the clutch and starts to engage the clutch. Therefore, during an initial period of the gearshift, the supplied hydraulic pressure is increased to increase the speed at which the hydraulic pressure is supplied to the clutch thereby shortening the time delay. This correction is effected for a prescribed interval of time after the gearshift is started. The amount of such correction varies with the oil temperature since the time delay differs depending on the viscosity of the oil which depends on the oil temperature.

Since the torque thus calculated is the transmission input shaft torque, it is converted into a torque shared by the clutch used for effecting the gearshift in a step S47, and then a force for pressing the clutch piston, which is required to produce the torque share, is calculated from the relationship between the coefficient $\mu$ of friction and peripheral speed V of the clutch plates of the clutch in a step S48.

Once the required piston pressing force is calculated, a hydraulic pressure needed by the clutch can be calculated. A control pressure $P_{TH}$ as an accumulator back pressure for developing the hydraulic pressure is then determined. The necessary clutch pressure is offset from the control pressure $P_{TH}$ by an amount corresponding to the preload of the spring of the accumulator, and a centrifugal hydraulic pressure is developed in the clutch hydraulic pressure chamber since the clutch is rotating. Therefore, the clutch engaging torque is corrected for the offset and the centrifugal hydraulic pressure in the $A_{OFn}$ correction at the step S5 shown in FIG. 4.

A gearshift with the engaging torque thus established will be described in greater detail with respect to each of the gearshift modes.

The SYU mode will first be described with reference to FIG. 7A. When a gearshift command is issued at a time $t_1$ from a present gear position So to a target gear position Sa across the upshift curve $L_U$, the shift solenoid output is changed to the target gear position Sa at a time $t_2$ after elapse of the time set by the decision timer $T_1$. As the shift solenoid output is thus changed, the present-gear-position clutch is disengaged, and the target-gear-position clutch starts to be engaged. In the SYU mode, when the present-gear-position clutch (previous-gear-position clutch) is disengaged, the engine rotational speed varies such that the rotational speeds of the input and output members of the target-gear-position clutch (next-gear-position clutch) vary toward a synchronized speed. Therefore, the current Is supplied to the linear solenoid is minimized at this time, and the torque for engaging the next-gear-position clutch is set to a low value.

At this time, the input and output rotational speed ratio $e_{CLa}$ of the next-gear-position clutch has been detected. When the previous-gear-position clutch is disengaged a certain time delay after the gearshift has started, the ratio $e_{CLa}$ gradually approaches the synchronized time at which $e_{CLa}=1$. When the rotational speed ratio $e_{CLa}$ becomes a first decision value $e_{CSPU}$ at a time $t_4$, the current Is is increased up to a value corresponding to the engine torque ETQ. When the rotational speed ratio $e_{CLa}$ becomes a second decision value $e_{CCPU}$ at a time $t_5$, the current Is returns to its maximum value. Thus, the next-gear-position clutch starts being gradually engaged from a time before the synchronized time, and is fully engaged at the synchronized time, thus making the gearshift smooth. According to the present control sequence, when the engaging clutch is subjected to a slip greater than a predetermined amount, the engine output power is retarded by a certain amount (indicated by RK). The engine output power regard RK is started from a time $t_3$ when the rotational speed ratio $e_{CLo}$ between the input and output members of the previous-gear-position clutch increases beyond a prescribed value $e_{CRH}$. The engine output power retard RK returns to its original level (i.e., RO).

Figure 7B:
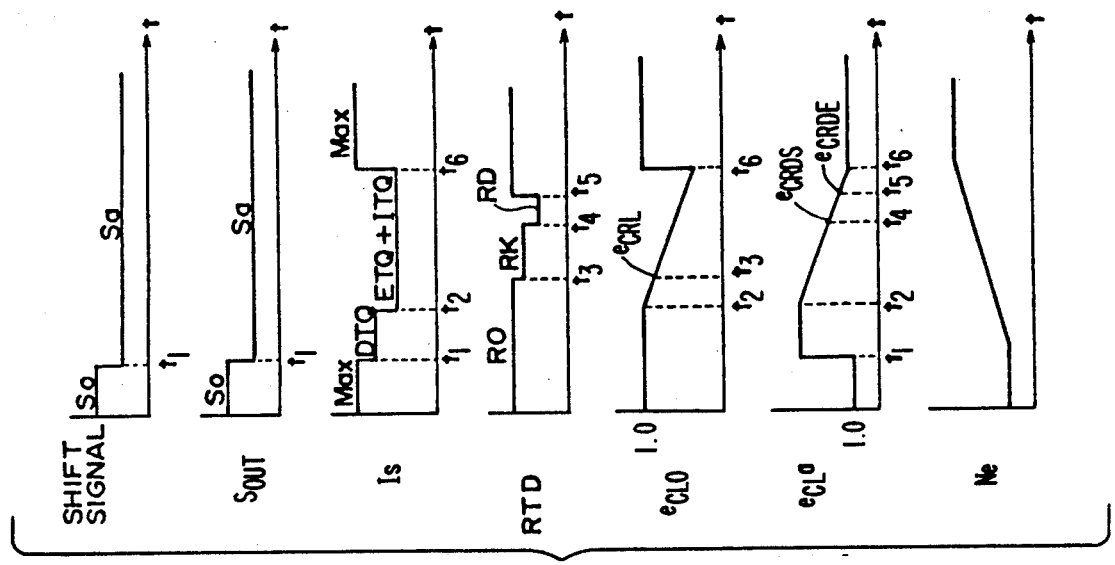
FIGS. 7A through 7E are graphs showing how gearshift control is effected depending on a gearshift mode.
Figure 7A:
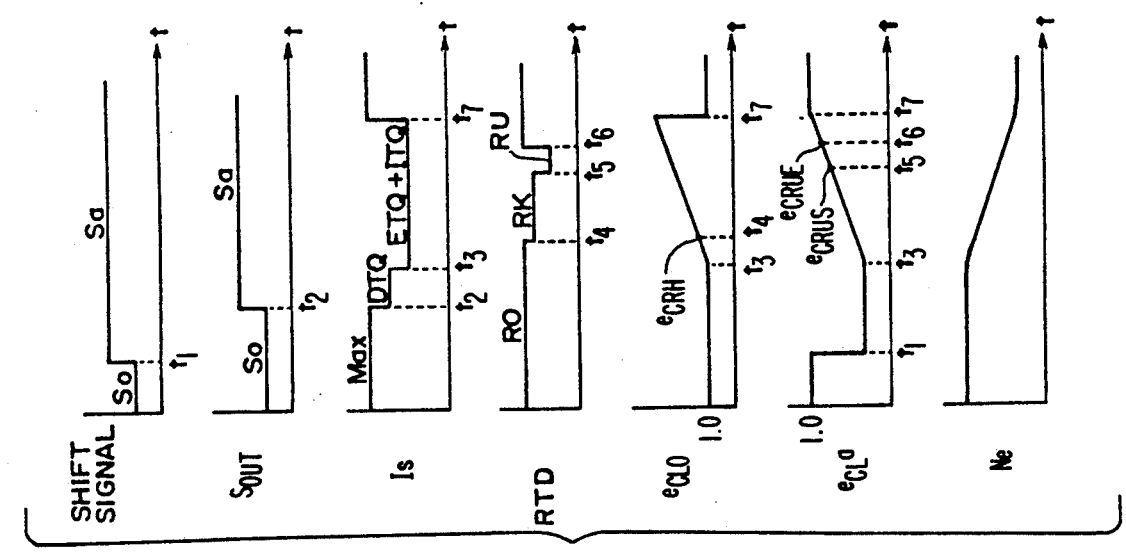

In the SYD mode, as shown in FIG. 7B, when a gearshift command is issued at a time $t_1$ from a present gear position So to a target gear position Sa, the shift solenoid output is immediately changed to the target gear position Sa. In the SYD mode, when the present-gear-position clutch is disengaged, the engine rotational speed varies such that the rotational speeds of the input and output members of the next-gear-position clutch vary toward a synchronized speed. Therefore, the current Is supplied to the linear solenoid is minimized at this time, the the torque for engaging the next-gear-position clutch is set to a low value.

When the previous-gear-position clutch is disengaged a certain time delay after the gearshift has started, the ratio $e_{CLa}$ gradually approaches the synchronized time at which $e_{CLa}=1$. When the rotational speed ratio $e_{CLa}$ becomes a first decision value $e_{CSPD}$ at a time $t_3$, the current Is is increased up to a value corresponding to the engine torque ETQ. When the rotational speed ratio $e_{CLa}$ becomes a second decision value $e_{CCPD}$ at a time $t_5$, the current Is returns to its maximum value. Thus, the next-gear-position clutch starts being gradually engaged from a time before the synchronized time, and is fully engaged at the synchronized time, thus making the gearshift smooth. If the current were controlled to return directly to its maximum value from the time $t_5$, the next-gear-position clutch would quickly be engaged, thus producing a gearshift shock. To avoid this, the current returns to its maximum value at a constant rate until the rotational speed ratio $e_{CLa}$ becomes 1.0 as shown.

According to the present control sequence, when the engaging clutch is subjected to a slip greater than a predetermined amount, the engine output power is retarded by a certain amount (indicated by RK). The engine output power retard RK is started from a time $t_2$ when the rotational speed ratio $e_{CLo}$ between the input and output members of the previous-gear-position clutch decreases below a prescribed value $e_{CRL}$. To prevent a shock from being produced when the clutch is completely engaged, an amount of retard RD, which is greater than the amount of retard RK, is established from the time when the rotational speed ratio $e_{CLa}$ reaches a reference value $e_{CRDS}$ to the time when the ratio $e_{CLa}$ reaches a reference value $e_{CRDE}$.

Figure 7D:
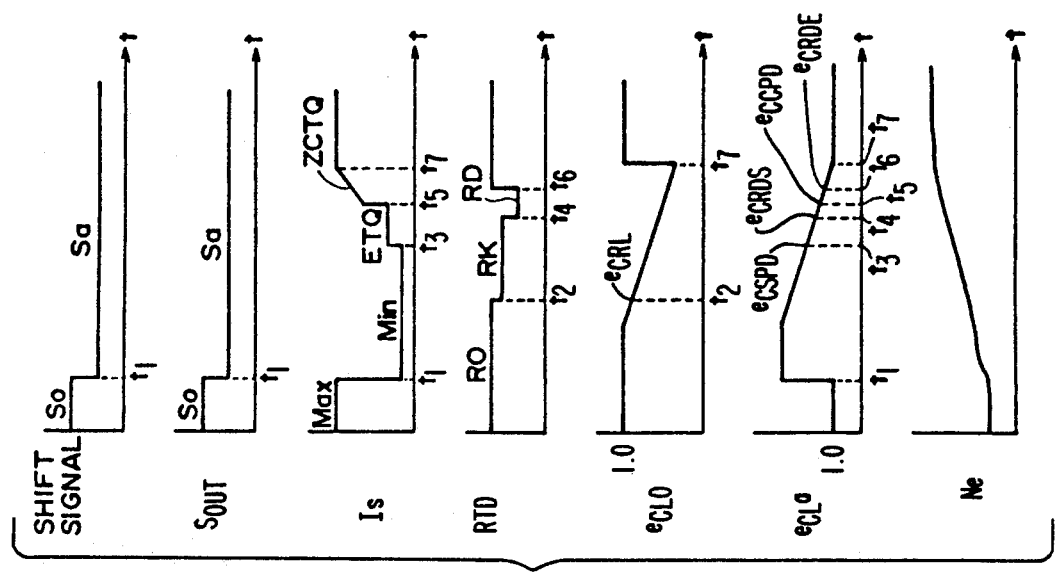
Figure 7C:
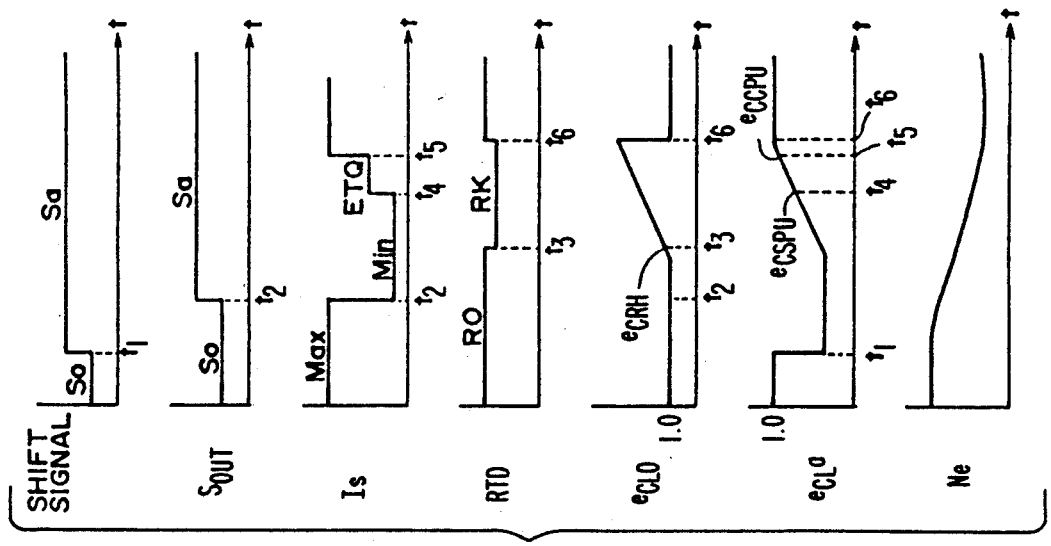

In the IPU mode, as shown in FIG. 7C, when a gearshift command is issued at a time $t_1$ from a present gear position So to a target gear position Sa, the shift solenoid output is changed to the target gear position Sa at a time $t_2$ after elapse of the time set by the decision timer $T_1$. In the IPU mode, when the present-gear-position clutch (previous-gear-position clutch) is disengaged, the engine rotational speed varies such that the rotational speeds of the input and output members of the target-gear-position clutch (next-gear-position clutch) vary away from a synchronized speed. In view of this, the next-gear-position clutch should start to be engaged immediately in order to cause the engine rotational speed to approach the synchronized speed.

To this end, the current Is to be supplied to the linear solenoid is set, from this time on, to a value corresponding to the sum of the engine torque ETQ and the inertia torque ITQ. However, since it takes a certain time after the shift solenoid is energized until the hydraulic pressure is supplied to the next-gear-position clutch, resulting in a time delay before the clutch starts to be engaged, a current corresponding to a torque DTQ greater than the torque (ETQ+ITQ) is set after the time $t_2$ until the ratio $e_{CLa}$ between the rotational speeds of the input and output members of the next-gear-position clutch begins to vary, i.e., until a time $t_3$ when the next-gear-position clutch starts being engaged, so that the time delay will be shortened. Thereafter, the current Is returns to its maximum value at a time $t_7$ when the rotational speed ratio $e_{CLa}$ becomes substantially 1.

According to the present control sequence, when the engaging clutch is subjected to a slip greater than a predetermined amount, the engine output power is retarded by a certain amount (indicated by RK). The engine output power regard RK is started from a time $t_4$ when the rotational speed ratio $e_{CLo}$ between the input and output members of the previous-gear-position clutch increases beyond a prescribed value $e_{CRH}$. An amount of retard RU, which is greater than the amount of retard RK, is established from a time $t_5$ when the rotational speed ratio $e_{CLa}$ exceeds a reference value $e_{CRUS}$ to a time $t_6$ when the ratio $e_{CLa}$ exceeds a reference value $e_{CRUE}$, so that the hydraulically operated clutch will be smoothly engaged completely.

In the IPD mode, as shown in FIG. 7D, when a gearshift command is issued at a time $t_1$ from a present gear position So to a target gear position Sa the shift solenoid output is immediately changed to the target gear position Sa. In the IPD mode, when the present-gear-position clutch (previous-gear-position clutch) is disengaged, the engine rotational speed varies such that the rotational speeds of the input and output members of the target-gear-position clutch (next-gear-position clutch) vary away from a synchronized speed. In view of this, the next-gear-position clutch should start to be engaged immediately.

To this end, the current Is to be supplied to the linear solenoid is set, from this time $t_1$ on, to a value corresponding to the sum of the engine torque ETQ and the inertia torque ITQ. However, because of a time delay after the shift solenoid is energized until the next-gear-position clutch starts to be engaged, a current corresponding to a torque DTQ greater than the torque (ETQ+ITQ) is set after the time $t_1$ until a time $t_2$ when the ratio $e_{CLa}$ between the rotational speeds of the input and output members of the next-gear-position clutch begins to vary. Thereafter, the current Is returns to its maximum value at a time $t_6$ when the rotational speed ratio $e_{CLa}$ becomes substantially 1.0.

According to the present control sequence, too, when the engaging clutch is subjected to a slip greater than a predetermined amount, the engine output power is retarded by a certain amount (indicated by RK). The engine output power regard RK is started from a time $t_3$ when the rotational speed ratio $e_{CLo}$ between the input and output members of the previous-gear-position clutch decreases below a prescribed value $e_{CRL}$. An amount of retard RD, which is greater than the amount of retard RK, is established from the time when the rotational speed ratio $e_{CLa}$ drops below a reference value $e_{CRDS}$ to the time when the ratio $e_{CLa}$ falls below a reference value $e_{CRDE}$.

Figure 7E:
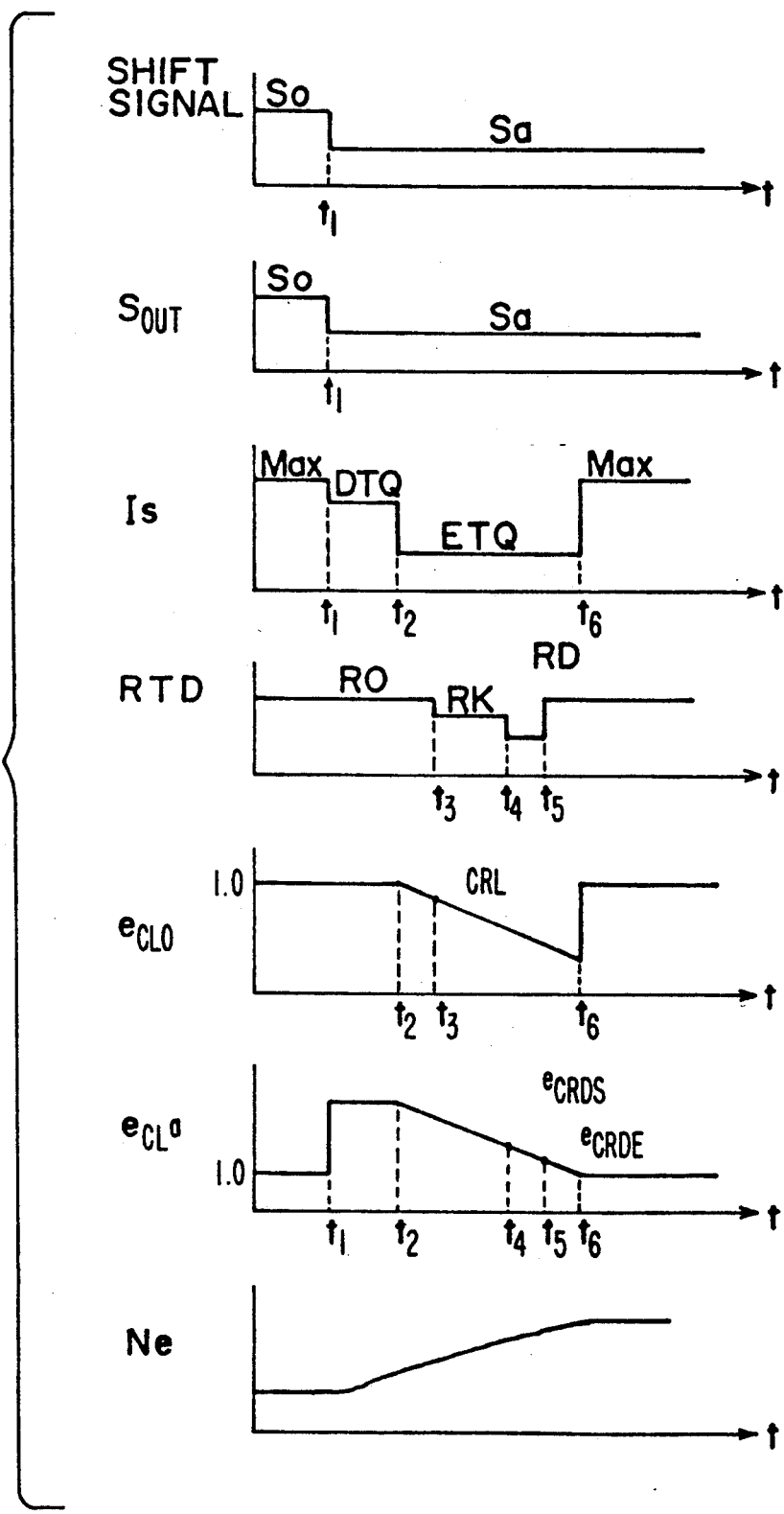

The EPD mode is similar to the IPD mode in that it is also the power-off/downshift mode. Therefore, the gearshift control for the EPD mode is almost the same as that for the IPD mode as shown in FIG. 7E. These modes are however different from each other in that the current Is supplied to the linear solenoid is of a value corresponding to the sum of the engine torque ETQ and the inertia torque ITQ in the IPD mode, whereas the current Is is of a value corresponding to the engine torque ETQ in the EPD mode. This is because in the IPD mode, the upshift is effected according to the intention of the driver, and hence the gearshift should be effected quickly and an allowable level of gearshift shocks is relatively high, whereas in the EPD mode, the downshift is automatically effected irrespectively of the intention of the driver and hence an allowable level of gearshift shocks is relatively low, so that the clutch is engaged gradually to suppress a gearshift shock.

In the SYU and SYD modes, a value corresponding to the engine throttle valve opening may be used, instead of a value corresponding to the engine torque ETQ, as the value of the current Is before the next-gear-position clutch is engaged.

In the manner described above, the optimum gearshift control is carried out in each of the gearshift modes.

In the above embodiment, the clutch pressure which determines the clutch engaging torque is controlled using the control pressure $P_{TH}$ acting as the accumulator back pressure. However, the present invention is not limited to such an arrangement. The clutch pressure may be directly controlled by the linear solenoid valve. In such a modification, the correction of the clutch pressure for the offset due to the preload of the accumulator spring is dispensed with. The control pressure may be generated by a duty-ratio-controlled solenoid valve, rather than the linear solenoid valve.

Figure 8:
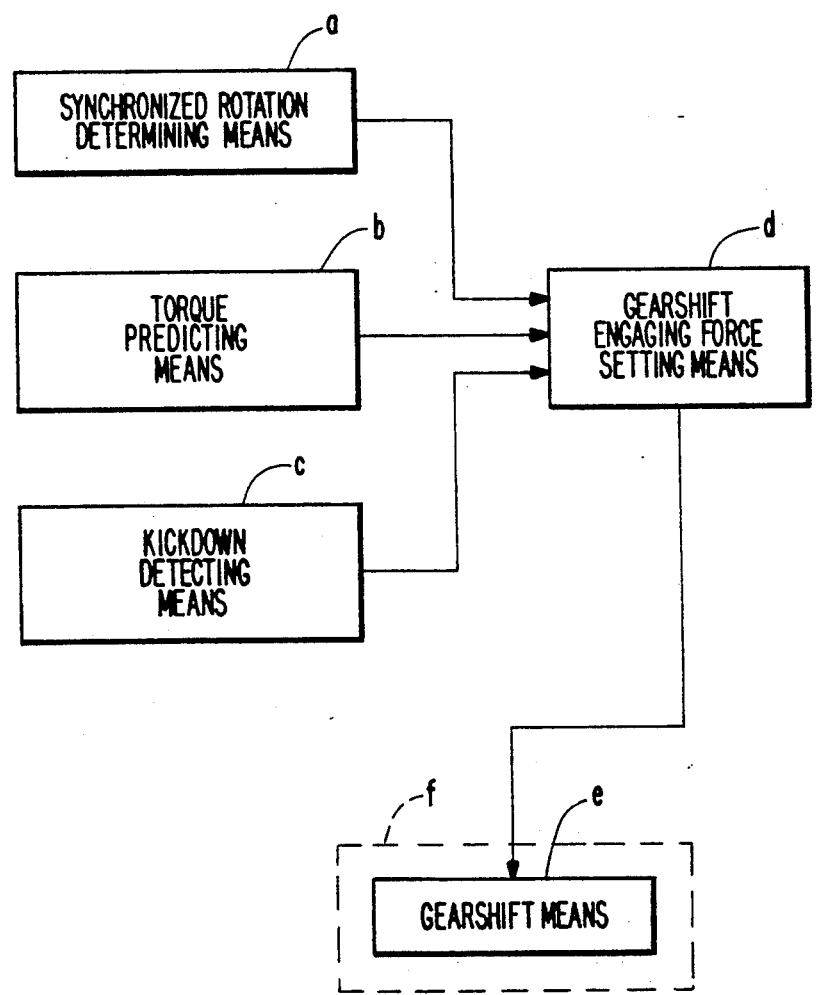
FIG. 8 is a block diagram of a gearshift control apparatus according to a second embodiment of the present invention.

A gearshift control apparatus according to a second embodiment of the present invention will be described below. As shown in FIG. 8, the gearshift control apparatus of the second embodiment, which controls a transmission f for selecting a power transmission path by engaging and disengaging gearshift means e, includes a synchronized rotation determining means a for determining synchronization of the input and output rotational speeds of the gearshift means e by detecting when the relative rotational speed between the input and output rotatable members of the gearshift means e is substantially zero, a torque predicting means b for predicting a torque to be transmitted through the gearshift means e which torque would be generated if the next-gear-position gearshift means e were completely connected, when the next-gear-position gearshift means e is not engaged, a kickdown detecting means c for detecting whether a gearshift is in the power-on/downshift mode, and an engaging force setting means d for setting an engaging force for the next-gear-position gearshift means e to an engaging force corresponding to a torque predicted by the torque predicting means b for a period of time after a gearshift in the power-on/downshift mode is detected by the kickdown detecting means c until synchronization of the input and output rotational speeds of the next-gear-position gearshift means e is determined by the synchronized rotation determining means a, and for increasing the engaging force up to a predetermined engaging force after synchronization of the input and output rotational speeds is determined.

The synchronized rotation determining means a may determine synchronized rotation by detecting whether the input and output rotational speed ratio of the gearshift means e becomes substantially 1.0 or not. Preferably, the synchronized rotation determining means a should determine synchronization of the input and output rotational speeds of the gearshift means e when it detects that the relative rotational speed which is zero has continued over a predetermined period of time.

If a gearshift to be effected in the power-on/downshift mode is detected by the kickdown detecting means c, the engaging force for the previous-gear-position gearshift means (e.g., a hydraulically operated clutch) is released to disengage this gearshift means. Since the engine is in the power-on condition (with the accelerator pedal depressed), the engine rotational speed is quickly increased, and the input and output rotational speeds of the next-gear-position gearshift means quickly vary toward a synchronized speed. At the same time, the torque predicting means predicts a torque from the engine which torque would be transmitted through the next-gear-position gearshift means if it were completely engaged at this time. During the period of time before the input and output rotational speeds are synchronized, the engaging force for the next-gear-position gearshift means is set to a value necessary to generate the predicted torque. When it is determined by the synchronized rotation determining means that the input and output rotational speeds have been synchronized (preferably that the condition of the input and output rotational speed ratio being 1.0 has continued over the predetermined period of time, for example), the engaging force for the next-gear-position gearshift means is increased up to the predetermined engaging force.

Figure 9:
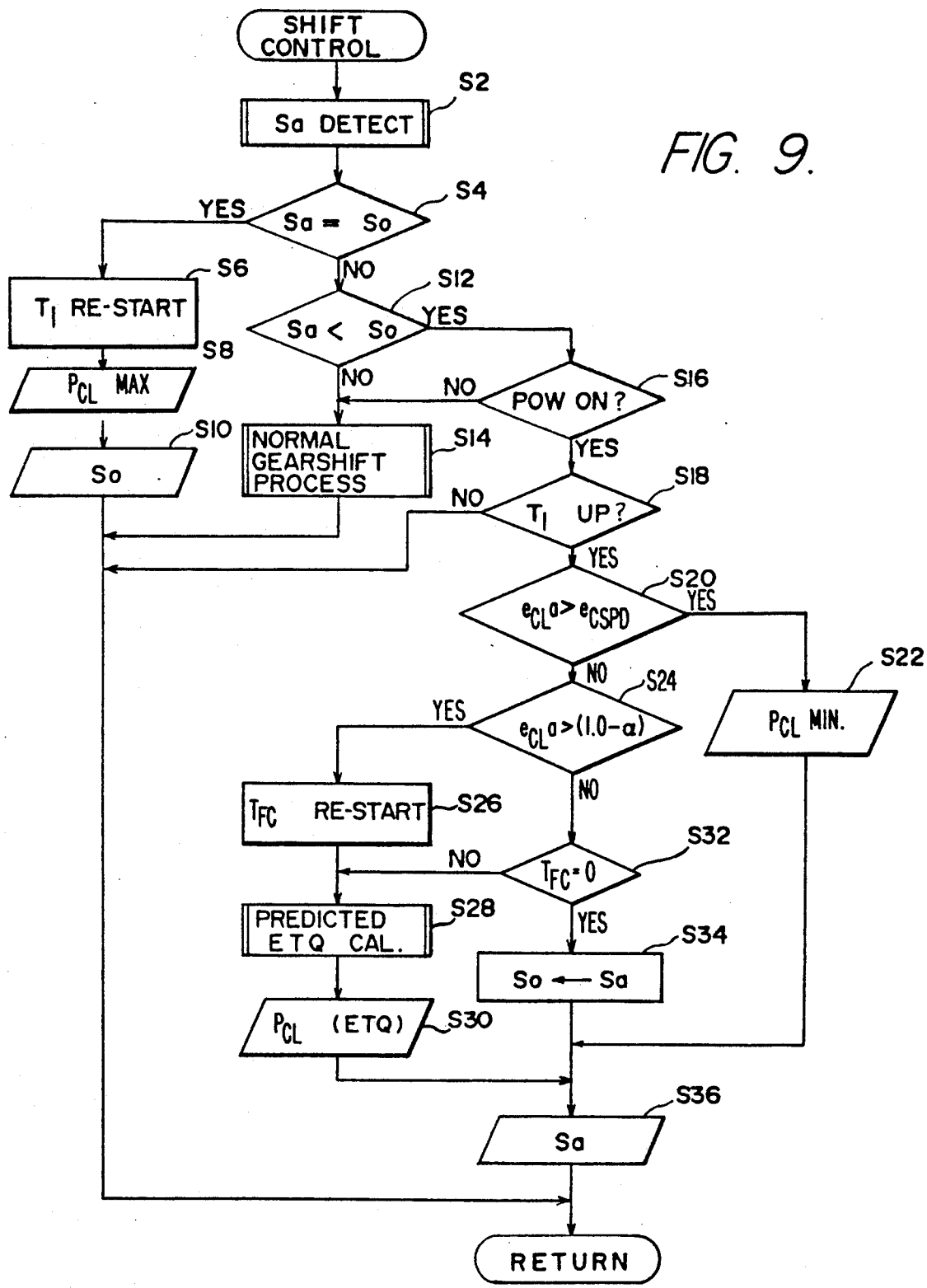
FIGS. 9 and 10 are a flowchart and a graph, respectively, showing a control sequence of the gearshift control apparatus illustrated in FIG. 8.
Figure 10A:
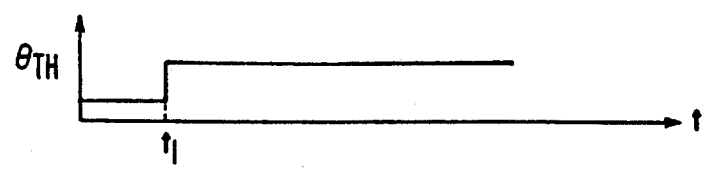
Figure 10B:
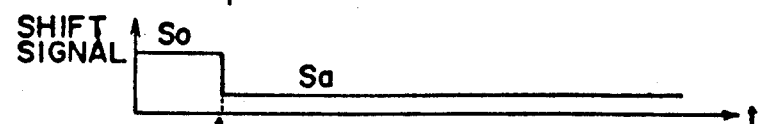
Figure 10C:
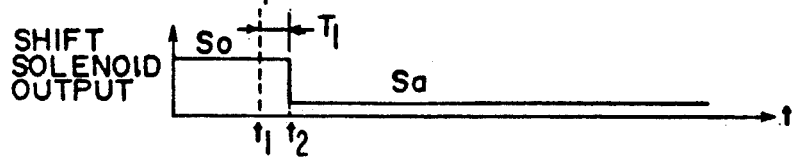
Figure 10D:
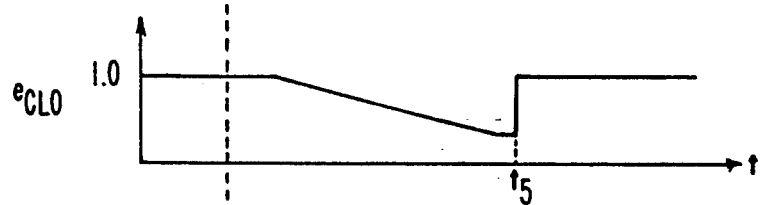
Figure 10E:
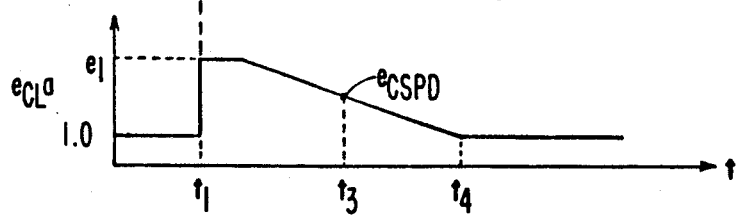
Figure 10F:
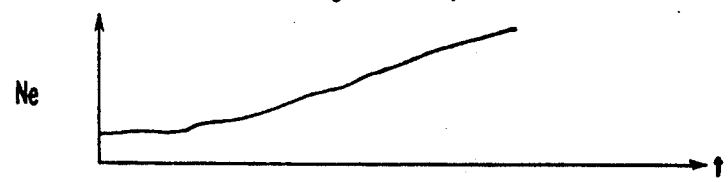
Figure 10G:
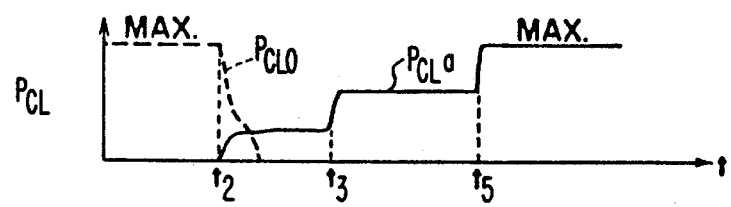
Figure 10H:
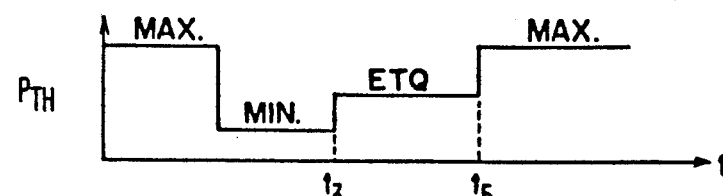
Figure 10I:
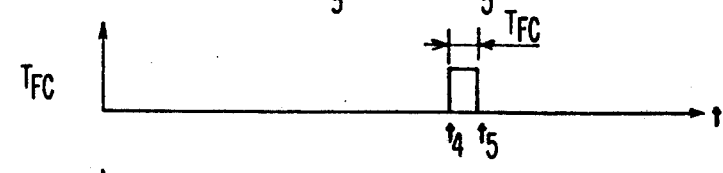
Figure 10J:
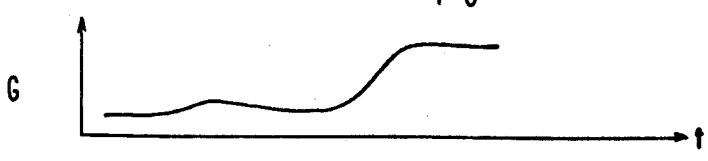

The above control process will be described in detail with reference to the flowchart of FIG. 9 and the graph of FIG. 10.

A step S2 seeks or detects a target gear position Sa with respect to a present gear position So from a shift map, and then a step S4 determines whether the gear positions So, Sa are equal to each other or not. The gear positions So, Sa are equal to each other if no gearshift command is issued. In this case, control goes to steps S6 through S10 in which a gearshift decision timer $T_1$ is re-started, a clutch pressure $P_{CL}$ is set to a maximum value, and the present gear position So is kept.

Such a condition is shown in FIG. 10 up to a time $t_1$. A gearshift command from the controller 30 and outputs from the shift solenoids 22, 23 are to keep the present gear position So. Therefore, the present gear position So and the target gear position Sa are the same as each other, and the input and output rotational speed ratio $e_{CLo}$ ($=e_{CLa}$) of the gearshift clutch is 1.0. The control pressure $P_{TH}$ is set to a maximum value by the linear solenoid valve 56, and hence the clutch pressure $P_{CL}$ for the hydraulically operated clutch (gearshift means) which selects the present gear position is maximized.

The accelerator pedal is depressed at the time $t_1$ to increase the throttle opening $\theta_{TH}$. When a gearshift command for a downshift is issued, a new target gear position Sa is established, resulting in a condition Sa≠So. Control then goes to a step S12 which determines whether Sa < So, i.e., the gearshift is a downshift or not. If the gearshift is an upshift, then control goes to a step S14 in which the gearshift process for the upshift is effected. If the gearshift is a downshift, then control goes to a step S16 which determines whether the gearshift is in the power-on mode or not. If not the power-on mode, then control goes to the step S14 in which the corresponding gearshift process is carried out. Since the power-on/downshift mode is addressed in this embodiment, the control process in the step S14 will not be described in detail. When the gearshift command is issued for a gearshift, the present gear position So is the previous gear position and the target gear position Sa is the next gear position.

If the gearshift is in the power-on/downshift mode, then control goes to a step S18 which waits for the elapse of a time set by the gearshift decision timer $T_1$ from the time the gearshift command has been issued. Control then goes from the step S18 to a step S20. The gearshift decision timer $T_1$ is used to prevent gearshifts from being effected too quickly in the event that different gearshift commands are successively issued in a short period of time. For example, if a gearshift command for a gearshift from the third gear position to the second gear position is issued before the time set by the gearshift decision timer $T_1$ expires after a gearshift command for a gearshift from the fourth gear position to the third gear position has been issued, then a gearshift from the fourth gear position to the second gear position is actually carried out upon elapse of the time set by the gearshift decision timer $T_1$.

As shown in FIG. 10, if a gearshift command for a gearshift from the present gear position So to the target gear position Sa is issued at the time $t_1$, then the shift solenoid output changes from So to Sa at a time $t_2$ upon elapse of the time set by the gearshift decision timer $T_1$ at the step S14. When the gearshift command is issued at the time $t_1$, the target gear position Sa is changed to the gear position according to the gearshift command. Therefore, the input and output rotational speed ratio $e_{CLa}$ of the target-gear-position (next-gear-position) clutch is changed to a value $e_1$ for the clutch at the target gear position.

When the shift solenoid output changes to Sa at the time $t_2$, the clutch pressure $P_{CLo}$ for the hydraulically operated clutch for the present gear position So (previous gear position) is released to drain and sharply drops. At the same time, a hydraulic pressure is established for the clutch for the target gear position Sa (next gear position). At this time, a step S20 detects the input and output rotational speed ratio $e_{CLa}$ of the target-gear-position clutch, and determines whether the detected ratio $e_{CLa}$ is larger than a predetermined value $e_{CSPD}$. If $e_{CLa} > e_{CSPD}$, that is, if the input and output rotational speed ratio $e_{CLa}$ of the target-gear-position clutch has not yet reached the predetermined value $e_{CSPD}$, then the clutch pressure $P_{CL}$ is set to a minimum value in a step S22.

The clutch pressure $P_{CL}$ is minimized by minimizing the control pressure $P_{TH}$ from the linear solenoid valve 56. When the clutch pressure $P_{CL}$ is minimum, the target-gear-position clutch is not engaged. Since the accelerator pedal has been depressed and the throttle opening $\theta_{TH}$ is large (in the power-on condition), the engine rotational speed quickly increases, and so does the input rotational speed of the target-gear-position clutch. The input and output rotational speed ratio $e_{CLa}$ of this clutch is rapidly lowered toward 1.0.

If the condition $e_{CLa} \leq e_{CSPD}$ is reached at a time $t_3$, control goes from the step S20 to a step S24 which determines whether the rotational speed ratio $e_{CLa}$ becomes $1.0 + \alpha$ ($\alpha$ is a very small value), i.e., whether the target-gear-position clutch has been substantially engaged, or not. If $e_{CLa} > (1.0 + \alpha)$, i.e., if the target-gear-position clutch has only been partly engaged, control proceeds to steps S26 through S30 in which an engagement decision timer $T_{FC}$ is re-started, a predicted torque $E_{TQ}$ which would be transferred through the clutch is calculated, and a clutch pressure $P_{CL}$ (ETQ) necessary to generate the torque ETQ is established.

The predicted torque ETQ is a torque which would be transmitted through the target-gear-position clutch if this clutch were engaged. The predicted torque ETQ is read from a graph shown in FIG. 11 which is based on the predetermined relationship the engine throttle opening $\theta_{TH}$ and the engine rotational speed Ne. Since the torque ETQ is approximately proportional to the throttle opening $\theta_{TH}$, the torque ETQ may be calculated by a simple process of multiplying the throttle opening $\theta_{TH}$ by a certain coefficient k. The clutch pressure $P_{CL}$ (ETQ) necessary to produce the torque ETQ is read from the graph of FIG. 12 which is based on the predetermined relationship between the clutch pressure $P_{CL}$ and the torque ETQ. The clutch pressure $P_{CL}$ (ETQ) is obtained by setting the control pressure $P_{TH}$ to a prescribed value $P_{TH}$ (ETQ) with the linear solenoid valve 56.

Therefore, at the time $t_3$, the control pressure $P_{TH}$ is increased to the value $P_{TH}$ (ETQ). The clutch pressure $P_{CL}$ thus becomes the hydraulic pressure $P_{CL}$ (ETQ) which produces a torque that is the same as the predicted torque ETQ. The input and output members of the target-gear-position clutch start being gradually engaged, and this clutch is engaged without causing a gearshift shock and engine racing.

If the input and output rotational speed ratio $e_{CLa}$ of the target-gear-position clutch becomes smaller than $(1.0 + \alpha)$, indicating that this clutch is substantially engaged, then control proceeds to a step S32 which waits for the time period (from a time $t_4$ to a time $t_5$) set by the engagement decision timer $T_{FC}$ to elapse. Thereafter, the target gear position Sa is set as the present gear position So in a step S34. In a next cycle, therefore, the step S4 determines that Sa=So, and then the clutch pressure $P_{CL}$ is increased to its maximum pressure (clutch engaging pressure) in the step S8.

Figure 13:
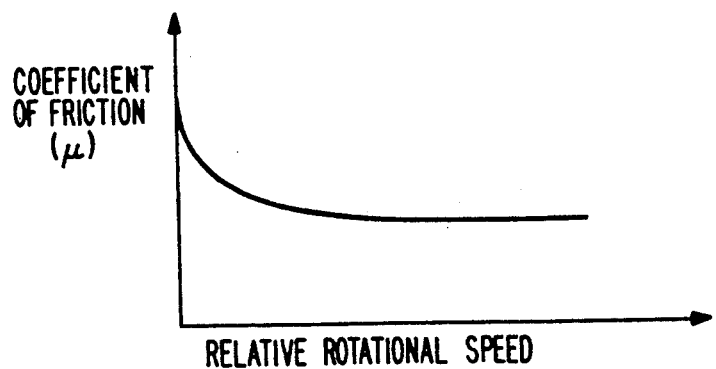
FIG. 13 is a graph showing the relationship between the relative rotational speed of a clutch and the coefficient of friction of a friction member.

The clutch pressure $P_{CL}$ may be maximized when the target-gear-position clutch is engaged at the time $t_4$. However, the clutch may still often undergo slight slippage at the time $t_4$, and if the clutch pressure were increased to the maximum value at the time $t_4$, the slippage might abruptly be taken up producing a gearshift shock. As shown in FIG. 13, the coefficient of friction of the clutch friction members is often of such a characteristic that it sharply increases when the relative rotational speed of the friction members approaches zero. Since the torque varies (increases) greatly immediately before the clutch is engaged, even if the slight slippage were taken up, the resultant torque variation would be large and the gearshift shock might be large.

According to the present control process, when the condition $e_{CLa} \leq (1.0 + \alpha)$ (the target-gear-position clutch is engaged) continues for a period of time longer than the time set by the timer $T_{FC}$, the clutch pressure $P_{CL}$ is increased to its maximum value. Therefore, when the clutch pressure $P_{CL}$ has been increased to its maximum value, the clutch slippage is completely eliminated, and no gearshift shock is produced.

Through the above control procedure, a gearshift with small gearshift shocks can be effected in the power-on/downshift. As shown in the graph of FIG. 10 at its bottom, the acceleration (deceleration) G applied to the motor vehicle varies smoothly.

The synchronized input and rotational speeds are determined by detecting when the input and output rotational speed ratio of the clutch becomes 1.0. However, the synchronized input and output rotational speeds may be determined by detecting when the difference between the input and output rotational speeds becomes zero.

Figure 14:
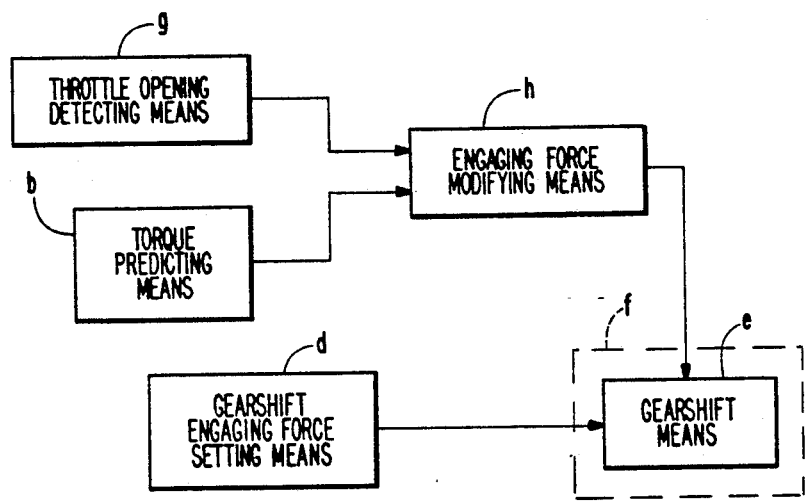
FIG. 14 is is a block diagram of a gearshift control apparatus according to a third embodiment of the present invention.

A gearshift control apparatus according to a third embodiment of the present invention will be described below. As shown in FIG. 14, the gearshift control apparatus of the second embodiment, which controls a transmission (power transmitting means) f for selecting a power transmission path by engaging and disengaging gearshift means e, includes an engaging force setting means d for setting an engaging force for the next-gear-position gearshift means e to a minimum value, and for setting the engaging force for the next-gear-position gearshift means e to a predetermined engaging force when the input and output rotational speed ratio of the next-gear-position gearshift means e becomes a predetermined value, a throttle opening detecting means g for detecting the throttle opening of the engine, a torque detecting means b for predicting a torque to be transmitted through the gearshift means e which torque would be generated if the next-gear-position gearshift means e were completely connected, when the next-gear-position gearshift means e is not engaged, and an engaging force modifying means for setting the engaging force for the next-gear-position gearshift means e to a value corresponding to the torque predicted by the torque predicting means b, irrespectively of the engaging force set by the engaging force setting means d, when the engine throttle opening detected by the throttle opening detecting means g becomes larger than a predetermined opening while a gearshift is being effected in the power-off/upshift mode.

When a gearshift is to be effected in the power-off/upshift mode, the engaging force of the previous-gear-position (e.g., a hydraulically operated clutch) is released and this gearshift means e is disengaged. Since the engaging force for the next-gear-position gearshift means e is set to a minimum value by the engaging force setting means d, the next-gear-position gearshift means e remains disengaged. The engine rotational speed is lowered in the power-off condition (with the accelerator pedal released), and the input and output rotational speed ratio of the next-gear-position gearshift means e varies toward 1.0 (i.e., the input and output rotational speeds varies so that they are synchronized). When the input and output rotational speed ratio of the next-gear-position gearshift means e becomes a predetermined value, the engaging force for the next-gear-position gearshift means is set to the predetermined value by the engaging force setting means d, thus starting to engage the next-gear-position gearshift means.

The gearshift is normally controlled as described above. However, when it is detected by the throttle opening detecting means g that the throttle opening exceeds the predetermined opening during the gearshift in the power-off/upshift mode, the engaging force modifying means h is operated to set the engaging force for the next-gear-position gearshift means e to a value corresponding to the torque predicted by the torque predicting mean for thereby suppressing engine racing.

Figure 15:
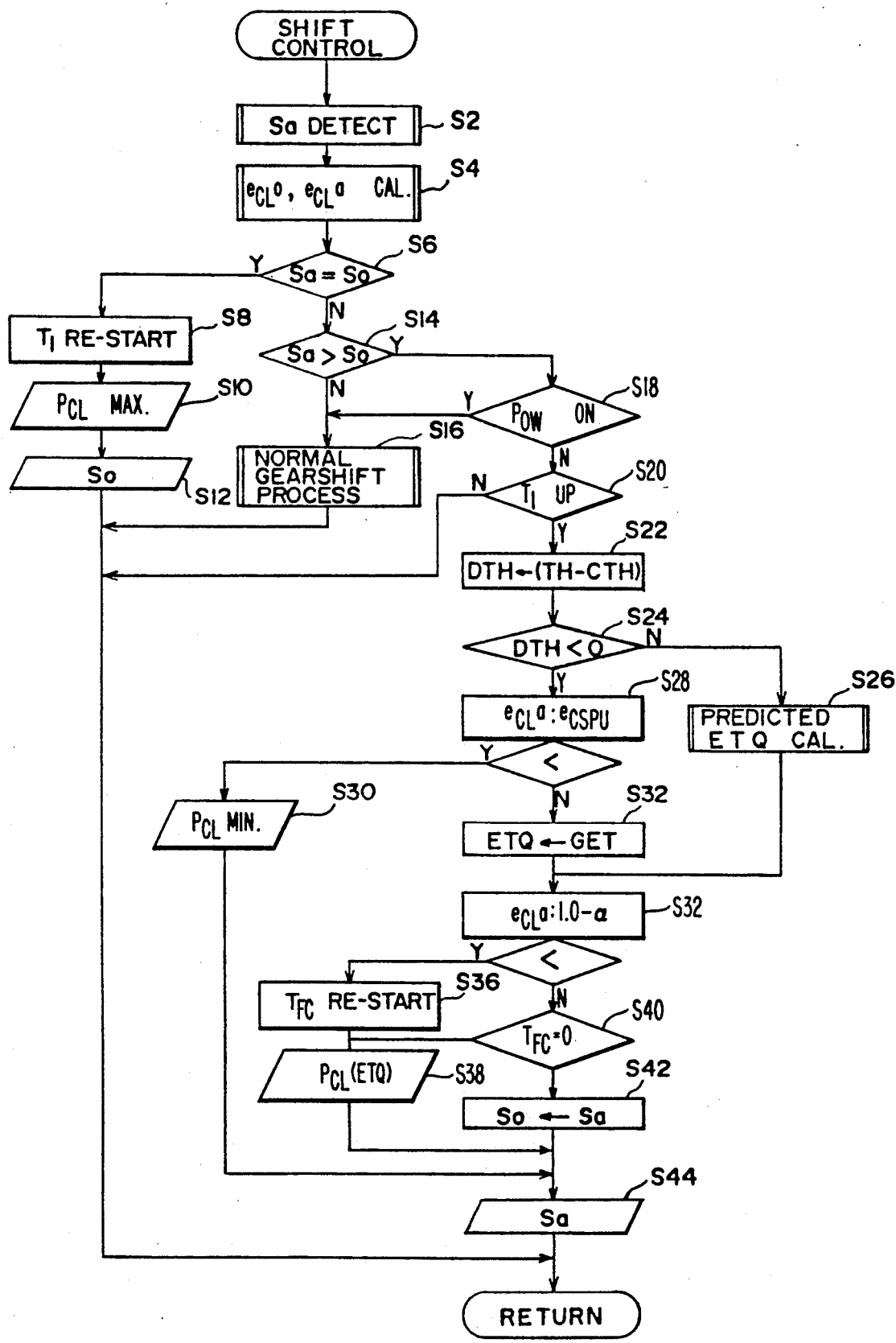
FIGS. 15 and 16 are a flowchart and a graph, respectively, showing a control sequence of the gearshift control apparatus shown in FIG. 14.

The above control process will be described in detail with reference to the flowchart of FIG. 15 and the graphs of FIG. 16.

A step S2 seeks or detects a target gear position Sa with respect to a present gear position So from a shift map, and then a step S4 calculates the input and output rotational speed ratios (=output rotational speed/input rotational speed) $e_{CLo}$, $e_{CLa}$ of the clutches in the gear positions So, Sa.

Then, a step S6 determines whether the gear positions So, Sa are equal to each other or not. The gear positions So, Sa are equal to each other if no gearshift command is issued. In this case, control goes to steps S8 through S12 in which a gearshift decision timer $T_1$ is re-started, a clutch pressure $P_{CL}$ is set to a maximum value, and the present gear position So is kept.

Figure 16:
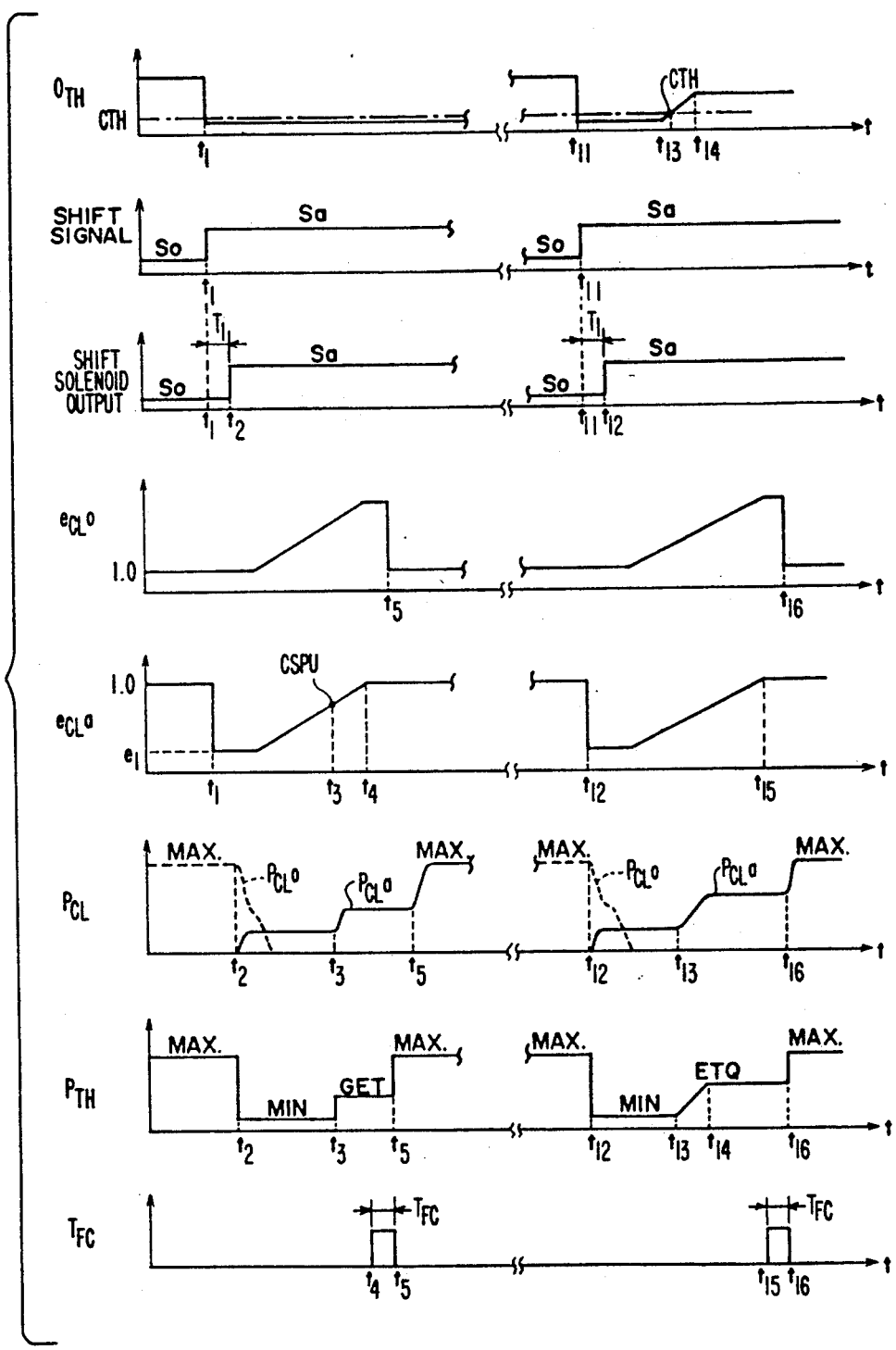

Such a condition is shown in FIG. 16 at (A) up to a time $t_1$. A gearshift command from the controller 30 and outputs from the shift solenoids 22, 23 are to keep the present gear position So. Therefore, the present gear position So and the target gear position Sa are the same as each other, and the input and output rotational speed ratio $e_{CLo}$ (=$e_{CLa}$) of the gearshift clutch is 1.0. The control pressure $P_{TH}$ is set to a maximum value by the linear solenoid valve 56, and hence the clutch pressure $P_{CL}$ for the hydraulically operated clutch (gearshift means) which selects the present gear position is maximized.

The accelerator pedal is released at the time $t_1$ to reduce the throttle opening $\theta_{TH}$. When a gearshift command for an upshift is issued, a new target gear position Sa is established, resulting in a condition Sa≠So. Control then goes to a step S14 which determines whether Sa<So, i.e., the gearshift is an upshift or not. If the gearshift is a downshift, then control goes to a step S16 in which the gearshift process for the downshift is effected. If the gearshift is an upshift, then control goes to a step S18 which determines whether the gearshift is in the power-on mode or not. If not the power-on mode, then control goes to the step S16 in which the corresponding gearshift process is carried out. Since the power-off/downshift mode is addressed in this embodiment, the control process in the step S16 will not be described in detail. When the gearshift command is issued for a gearshift, the present gear position So is the previous gear position and the target gear position Sa is the next gear position.

If the gearshift is in the power-off/upshift mode, then control goes to a step S20 which waits for the elapse of a time set by the gearshift decision timer $T_1$ from the time the gearshift command has been issued. Control then goes from the step S20 to a step S22. The gearshift decision timer $T_1$ is used to prevent gearshifts from being effected too quickly in the event that different gearshift commands are successively issued in a short period of time. For example, if a gearshift command for a gearshift from the third gear position to the fourth gear position is issued before the time set by the gearshift decision timer $T_1$ expires after a gearshift command for a gearshift from the second gear position to the third gear position has been issued, then a gearshift from the second gear position to the fourth gear position is actually carried out upon elapse of the time set by the gearshift decision timer $T_1$.

As shown in FIG. 16, if a gearshift command for a gearshift from the present gear position So to the target gear position Sa is issued at the time $t_1$, then the shift solenoid output changes from So to Sa at a time $t_2$ upon elapse of the time set by the gearshift decision timer $T_1$. When the gearshift command is issued at the time $t_1$, the target gear position Sa is changed to the gear position according to the gearshift command. Therefore, as shown in FIG. 16 at (A), the input and output rotational speed ratio $e_{CLa}$ of the target-gear-position (next-gear-position) clutch is changed to a value $e_1$ for the clutch at the target gear position at the time $t_1$.

When the shift solenoid output changes to Sa at the time $t_2$, the clutch pressure $P_{CLo}$ for the hydraulically operated clutch for the present gear position So (previous gear position) is released to drain and sharply drops. At the same time, a hydraulic pressure is established for the clutch for the target gear position Sa (next gear position), thus actually starting to effect the gearshift in the power-off/upshift mode.

After the time $t_2$, a decision value DTH is calculated by subtracting a predetermined reference opening value CT from the throttle opening value TH detected by the throttle opening sensor 33 in a step S22. A step S24 then determine whether the decision value DTH is positive or negative. The reference opening value CTH is a reference value for determining whether the accelerator pedal is depressed from the power-off condition. As shown in FIG. 16 at the top indicating how the throttle opening varies, the throttle opening value TH (a value indicating the throttle opening $\theta_{TH}$) in the power-off condition is smaller than the reference value CTH. As the accelerator pedal is depressed from the power-off condition to increase the throttle opening, the throttle opening value TH becomes larger than the reference value CTH, as shown in FIG. 16 at (B). Therefore, the decision value DTH is negative in the power-off condition, and becomes positive when the accelerator pedal is depressed.

The gearshift which is effected with the decision value DTH remaining negative will be described below. Various control values in this gearshift vary as shown in FIG. 16 at (A).

A step S28 determines whether the input and output rotational speed ratio $e_{CLa}$ of the target-gear-position clutch is larger than a predetermined value $e_{CSPU}$. If $e_{CLa} < e_{CSPU}$, that is, if the input and output rotational speed ratio $e_{CLa}$ of the target-gear-position clutch has not yet reached the predetermined value $e_{CSPU}$, then the clutch pressure $P_{CL}$ is set to a minimum value in a step S30.

The clutch pressure $P_{CL}$ is minimized by minimizing the control pressure $P_{TH}$ from the linear solenoid valve 56. When the clutch pressure $P_{CL}$ is minimum, the target-gear-position clutch is not engaged. Since the engine is in the power-off condition, the engine rotational speed quickly decreases, and so does the input rotational speed of the target-gear-position clutch. The input and output rotational speed ratio $e_{CLa}$ of this clutch is rapidly varied toward 1.0.

If the condition $e_{CLa} \geq e_{CSPU}$ is reached at a time $t_3$, control goes from the step S28 to a step S32 in which the torque ETQ to be transferred is set to a predetermined value GET. Then, a step S34 determines whether the rotational speed ratio $e_{CLa}$ becomes larger than $1.0 - \alpha$ ($\alpha$ is a very small value), i.e., whether the target-gear-position clutch has been substantially engaged, or not. If $e_{CLa} < (1.0 - \alpha)$, i.e., if the target-gear-position clutch has only been partly engaged, control proceeds to steps S36 and S38 in which the engagement decision timer $T_{FC}$ is re-started, and a clutch pressure $P_{CL}$ (ETQ) necessary to generate the torque ETQ is established.

If the input and output rotational speed ratio $e_{CLa}$ of the target-gear-position clutch becomes larger than $(1.0 - \alpha)$, indicating that this clutch is substantially engaged, then control proceeds to a step S40 which waits for the time period (from a time $t_4$ to a time $t_5$) set by the engagement decision timer $T_{FC}$ to elapse. Thereafter, the target gear position Sa is set as the present gear position So in a step S42. In a next cycle, therefore, the step S6 determines that Sa=So, and then control goes to the steps S8 through S12 in which the clutch pressure $P_{CL}$ is increased to its maximum pressure (clutch engaging pressure).

According to the present control process, when the condition $e_{CLa} \geq (1.0 - \alpha)$ (the target-gear-position clutch is engaged) continues for a period of time longer than the time set by the timer $T_{FC}$, the clutch pressure $P_{CL}$ is increased to its maximum value.

It is now assumed that the accelerator pedal is depressed during a gearshift, the throttle opening value TH becomes greater than the reference value CTH, and the condition DTH $\geq$ 0 is reached. Various control values in this case vary as shown in FIG. 16 at (B).

Figure 11:
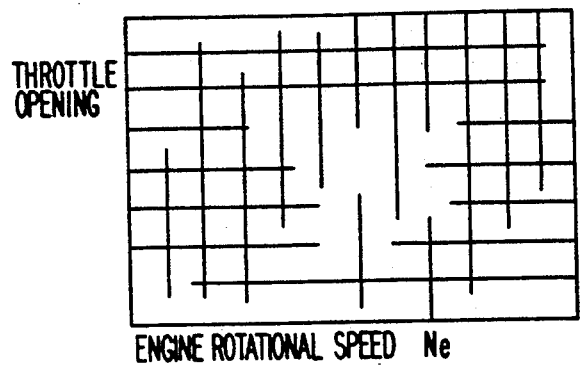
FIG. 11 is a diagram showing a graph for calculating a predicted torque to be transmitted.
Figure 12:
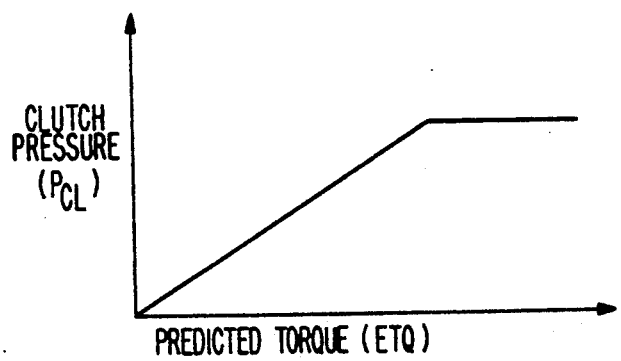
FIG. 12 is a graph showing the relationship between the predicted torque and a clutch pressure.

Control then goes from the step S24 to a step S26 in which a predicted torque ETQ is calculated from the graph of FIG. 11, and a clutch pressure $P_{CL}$ (ETQ) necessary to produce the torque ETQ is read from the graph of FIG. 12. The clutch pressure $P_{CL}$ (ETQ) is obtained by setting the control pressure $P_{TH}$ to a predetermined value $P_{TH}$ (ETQ) with the linear solenoid valve 56.

When the predicted torque ETQ has thus been calculated, control then goes to the step S34, and the step S34 and subsequent steps are executed. In this control process, the clutch pressure $P_{CL}$ in the step S38 is the clutch pressure $P_{CL}$ (ETQ) corresponding to the predicted torque ETQ. Therefore, as shown in FIG. 16 at (B), the control pressure $P_{TH}$ is set to $P_{TH}$ (ETQ) from the time $t_3$ when the decision value DTH becomes positive. The clutch pressure $P_{CL}$ becomes the hydraulic pressure $P_{CL}$ (ETQ) for generating the same torque as the predicted torque ETQ.

Therefore, when the accelerator pedal is depressed during the gearshift in the power-off/upshift mode, the torque to engage the next-gear-position clutch is set to the predicted torque ETQ, so that an increase produced in the engine output power by depressing the accelerator pedal is taken up by the next-gear-position clutch. Consequently, the engine is prevented from racing, and the gearshift is effected smoothly without gearshift shocks.

Figure 17:
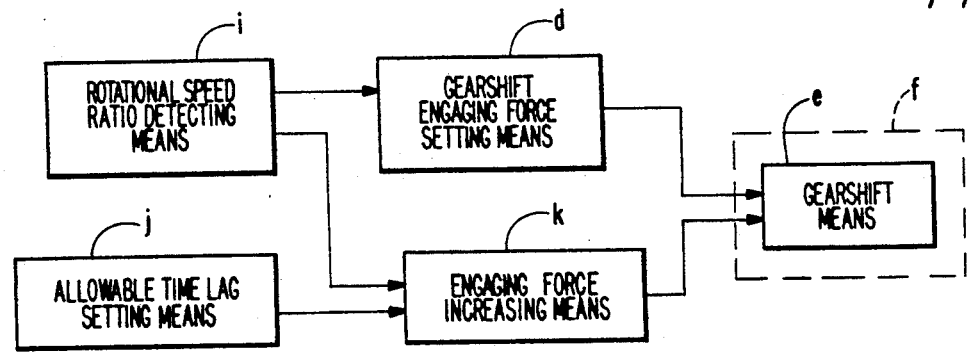
FIG. 17 is is a block diagram of a gearshift control apparatus according to a fourth embodiment of the present invention.

A gearshift control apparatus according to a fourth embodiment of the present invention will be described below. As shown in FIG. 17, the gearshift control apparatus of the second embodiment, which controls a transmission (power transmitting means) f for selecting a power transmission path by engaging and disengaging gearshift means e, includes a rotational speed ratio detecting means i for detecting the input and output rotational speed ratio of the gearshift means e, an engaging force setting means d for minimizing an engaging force for the next-gear-position gearshift means e when an output for effecting a gearshift in either the power-on/downshift mode or the power-off/upshift mode is issued, and for setting the engaging force for the gearshift means e to a predetermined value when the input and output rotational speed ratio of the next-gear-position gearshift means e as detected by the rotational speed ratio detecting means i reaches a predetermined value, an allowable time lag setting means j for setting an allowable time lag from the time when the output for effecting the gearshift is issued to the time when the input and output rotational speed ratio of the next-gear-position gearshift means starts to vary, and an engaging force increasing means k for increasing the engaging force for the next-gear-position gearshift means upon elapse of the allowable time lag if the input and output rotational speed ratio of the next-gear-position gearshift means does not start to vary during the allowable time lag after the output for effecting the gearshift has been issued.

When a gearshift in either the power-on/downshift or the power-off/upshift mode is to be effected, the engaging force for the previous-gear-position gearshift means (e.g., a hydraulically operated clutch) e is released, and this gearshift means e is disengaged. Since the engaging force for the next-gear-position gearshift means e is minimized by the engaging force setting means d, the next-gear-position gearshift means e remains disengaged. If in the power-on/downshift mode, the engine rotational speed (the input rotational speed of the clutch) is increased in the power-on condition (with the accelerator pedal depressed). If in the power-off/upshift mode, the engine rotational speed is lowered in the power-off condition (with the accelerator pedal released). In either of these modes, the input and output rotational speed ratio of the next-gear-position gearshift means e varies toward 1.0 (i.e., the input and output rotational speeds vary so as to be synchronized). At this time, the input and output rotational speed ratio of the next-gear-position gearshift means e has been detected by the rotational speed ratio detecting means i. When the detected input and output rotational speed ratio becomes a predetermined value, the engaging force for the next-gear-position gearshift means is set to a predetermined value by the engaging force setting means d, thus starting to engage the next-gear-position gearshift means.

The gearshift is normally controlled as described above. When a gearshift in either of the above modes is effected, an allowable time lag is established from the time the output to effect the gearshift is issued to the time the input and output rotational speed ratio of the next-gear-position means e starts to vary. If the next-gear-position gearshift means e does not start to be engaged even after elapse of the allowable time lag, then the engaging force for the next-gear-position gearshift means is forcibly increased by the engaging force increasing mean k. This gearshift means starts being engaged immediately after elapse of the allowable time lag, thus preventing a gearshift time lag from being increased.

The above control process will be described in detail with reference to the flowchart of FIG. 18A and the graphs of FIG. 19.

A step S2 seeks or detects a target gear position Sa with respect to a present gear position So from a shift map, and then a step S4 calculates the input and output rotational speed rations (=output rotational speed/input rotational speed) $e_{CLo}$, $e_{CLa}$ of the clutches in the gear positions So, Sa.

Then, a step S6 determines whether the gear positions So, Sa are equal to each other or not. The gear positions So, Sa are equal to each other if no gearshift command is issued. In this case, control goes to steps S8 through S12 in which a gearshift decision timer $T_1$ is re-started, a clutch pressure $P_{CL}$ is set to a maximum value, and the present gear position So is maintained.

Figure 19:
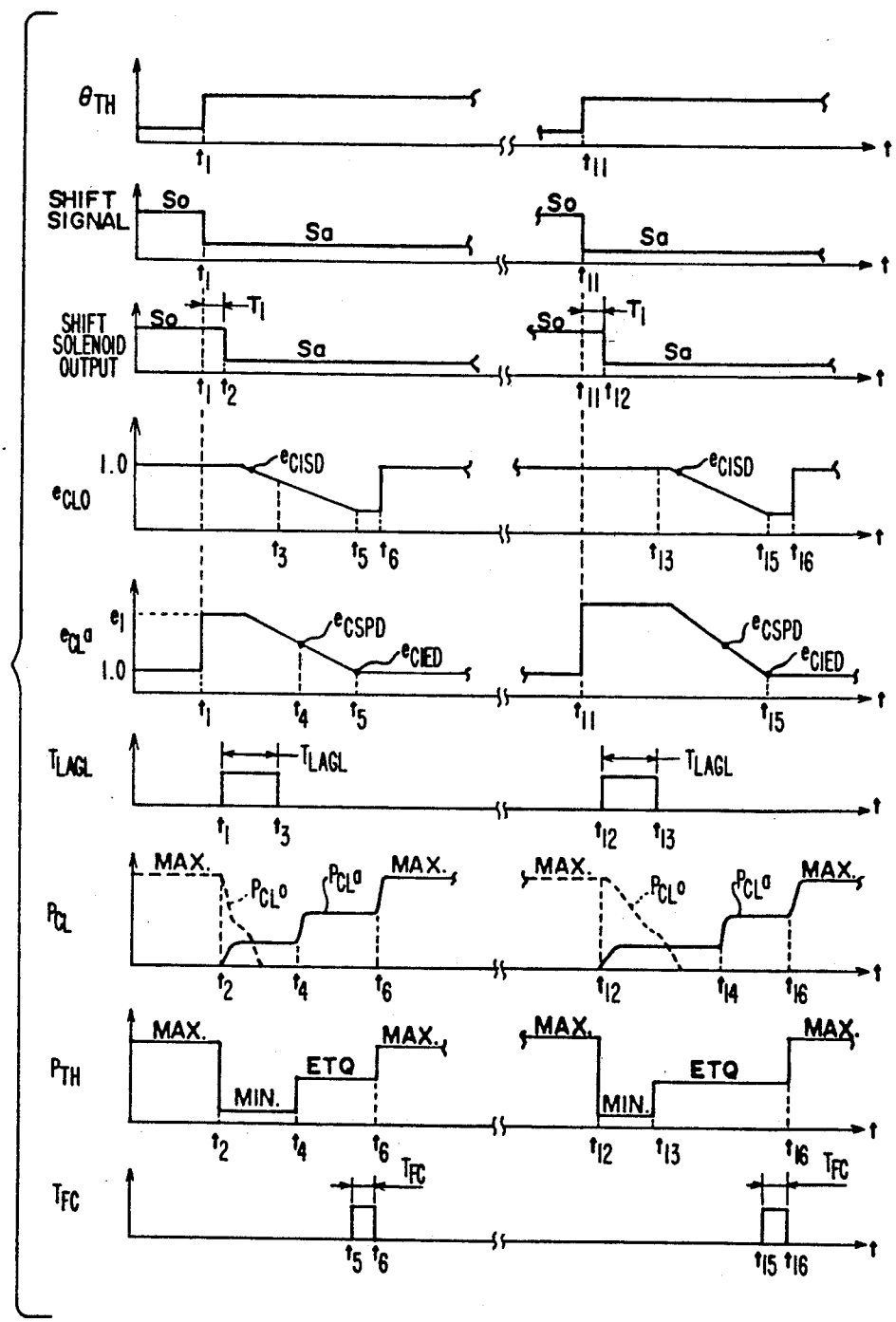
FIGS. 19 and 20 are graphs showing how various control values vary with respect to time in the control sequence shown in FIG. 17.
Figure 20A:
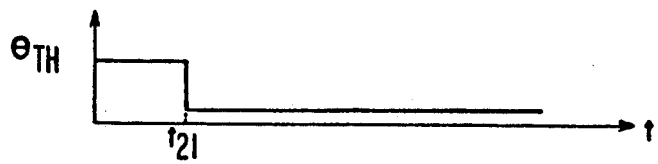
Figure 20B:
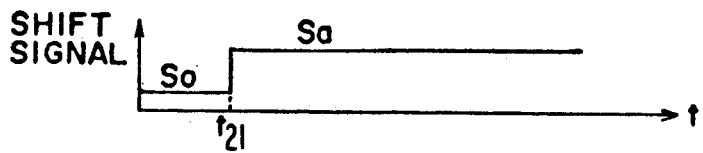
Figure 20C:
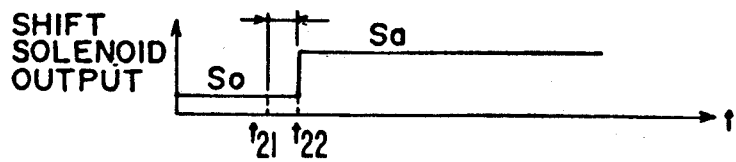
Figure 20D:
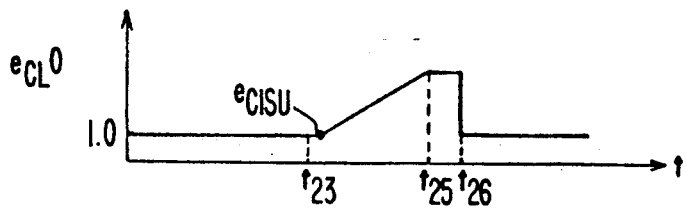
Figure 20E:
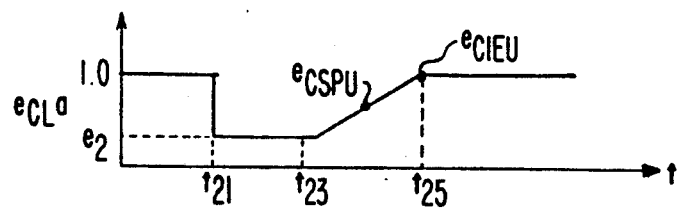
Figure 20F:
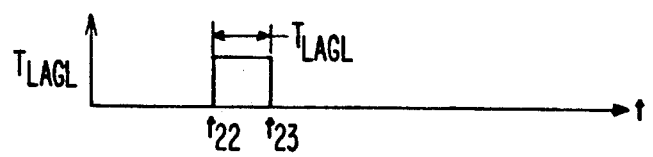
Figure 20G:
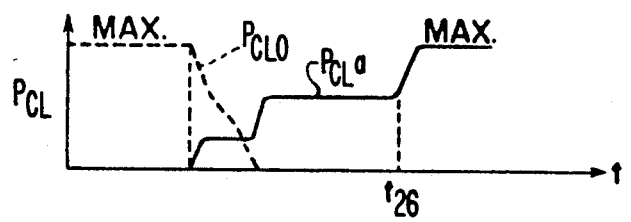
Figure 20H:
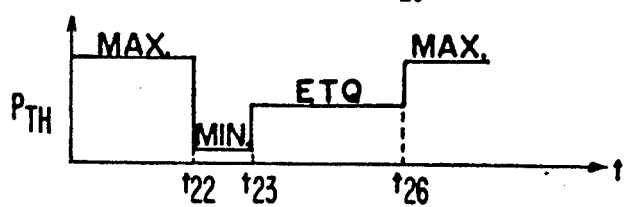
Figure 20I:
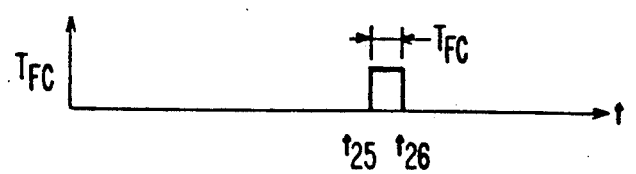

Such a condition is shown in FIG. 19 up to a time $t_1$. A gearshift command from the controller 30 and outputs from the shift solenoids 22, 23 are to keep the present gear position So. Therefore, the present gear position So and the target gear position Sa are the same as each other, and the input and output rotational speed ratio $e_{CLo}$ (=$e_{CLa}$) of the gearshift clutch is 1.0. The control pressure $P_{TH}$ is set to a maximum value by the linear solenoid valve 56, and hence the clutch pressure $P_{CL}$ for the hydraulically operated clutch (gearshift means) which selects the present gear position is maximized.

The accelerator pedal is released at the time $t_1$ to increase the throttle opening $\theta_{TH}$ quickly. When a gearshift command for a downshift is issued, a new target gear position Sa is established, resulting in a condition Sa≠So. Control then goes to a step S16 which determines whether Sa < So, i.e., the gearshift is an upshift or not. If the gearshift is a downshift, then control goes to the flowchart of FIG. 18B which will be described later on. If Sa < So, and hence the gearshift is a downshift, then control goes to a step S18 which determines whether the gearshift is in the power-on mode or not. If not the power-on mode, then control goes to a step S20 in which the gearshift in the power-off/downshift mode is effected. Since the power-on/downshift mode is addressed in this embodiment, the control process in the step S20 will not be described in detail. When the gearshift command is issued for a gearshift, the present gear position So is the previous gear position and the target gear position Sa is the next gear position.

If the gearshift is in the power-on/downshift mode, then control goes to a step S22 which waits for the elapse of a time set by the gearshift decision timer $T_1$ from the time the gearshift command has been issued. Control then goes from the step S22 to a step S26. Before the elapse of the time set by the gearshift decision timer $T_1$, a time lag timer $T_{LAGL}$ is set according to the gear positions So, Sa in this gearshift in a step S24. The gearshift decision timer $T_1$ is used to prevent gearshifts from being effected too quickly in the event that different gearshift commands are successively issued in a short period of time. For example, if a gearshift command for a gearshift from the third gear position to the second gear position is issued before the time set by the gearshift decision timer $T_1$ expires after a gearshift command for a gearshift from the fourth gear position to the third gear position has been issued, then a gearshift from the fourth gear position to the second gear position is actually carried out upon elapse of the time set by the gearshift decision timer $T_1$.

As shown in FIG. 19 at (A), if a gearshift command for a gearshift from the present gear position So to the target gear position Sa is issued at the time $t_1$, then the shift solenoid output changes from So to Sa at a time $t_2$ upon elapse of the time set by the gearshift decision timer $T_1$. When the gearshift command is issued at the time $t_1$, the target gear position Sa is changed to the gear position according to the gearshift command. Therefore, as shown in FIG. 19 at (A), the input and output rotational speed ratio $e_{CLa}$ of the target-gear-position (next-gear-position) clutch is changed to a value $e_1$ for the clutch at the target gear position at the time $t_1$.

When the shift solenoid output changes to Sa at the time $t_2$, the clutch pressure $P_{CLo}$ for the hydraulically operated clutch for the present gear position So (previous gear position) is released to drain and sharply drops. At the same time, a hydraulic pressure is established for the clutch for the target gear position Sa (next gear position). The time lag timer $T_{LAGL}$ starts counting time from this time. Thus, the time lag timer $T_{LAGL}$ starts counting time, not based on the gearshift command, but based on the shift solenoid output which starts actual operation for the gearshift.

After the time counted by the time lag timer $T_{LAGL}$, i.e., an allowable time lag, a step S28 determines whether the input and output rotational speed ratio $e_{CLo}$ of the present-gear-position clutch is larger than a gearshift start decision value $e_{CISD}$. The gearshift start decision value $e_{CISD}$ is slightly larger than 1.0. In the power-on/downshift mode, the input and output rotational speed $e_{CLo}$ varies so as to be smaller than 1.0. Therefore, if $e_{CLo}>e_{CISD}$, then the present-gear-position clutch is still engaged, and if $e_{CLo} \leq e_{CISD}$, then this clutch starts being disengaged. Since the input and output members of each clutch are mechanically coupled to each other as shown in FIG. 1, if the present-gear-position clutch is engaged and its input and output rotational speed ratio $e_{CLo}$ remains 1.0, then the input and output rotational speed ratio of the target-gear-position clutch remains to be of a predetermined value $e_1$ and does not vary. Therefore, whether the input and output rotational speed ratio $e_{CLa}$ of the target-gear-position clutch has varied or not can e known by detecting whether the input and output rotational speed ratio $e_{CLo}$ of the present-gear-position clutch has varied or not.

If $e_{CLo} \leq e_{CISD}$ in the step S28, that is, if the target-gear-position clutch starts being disengaged and the input and output rotational speed ratio of the present-gear-position clutch starts to vary until the time counted by the time lag timer $T_{LAGL}$ elapses, and the condition $e_{CLo} \leq e_{CISD}$ is reached at a time $t_3$ when the time counted by the time lag timer $T_{LAGL}$ elapses, as shown in FIG. 19 at (A), then the gearshift time lag will not be excessively long, and control goes to a step S30. The step S30 determines whether the input and output rotational speed ratio $e_{CLa}$ of the target-gear-position clutch is larger than a predetermined value $e_{CSPD}$. If $e_{CLa}>e_{CSPD}$, that is, if the input and output rotational speed ratio $e_{CLa}$ of the target-gear-position clutch has not yet reached the predetermined value $e_{CSPD}$, then the clutch pressure $P_{CL}$ is set to a minimum value in a step S32.

The clutch pressure $P_{CL}$ is minimized by minimizing the control pressure $P_{TH}$ from the linear solenoid valve 56. When the clutch pressure $P_{CL}$ is minimum, the target-gear-position clutch is not engaged. Since the accelerator pedal is depressed and the throttle opening $\theta_{TH}$ is large (the engine is in the power-off condition), the engine rotational speed quickly increases, and so does the input rotational speed of the target-gear-position clutch. The input and output rotational speed ratio $e_{CLa}$ of this clutch is lowered toward 1.0.

If the condition $e_{CLa} \leq e_{CSPD}$ is reached at a time $t_4$, control goes from the step S30 to a step S34 which determines whether the rotational speed ratio $e_{CLa}$ becomes smaller than an engagement completion decision value $e_{CIED}$, i.e., whether the target-gear-position clutch is substantially engaged or not. Therefore, the decision value $e_{CIED}$ is set to a value which is slightly larger than 1.0. If $e_{CLa}>e_{CIED}$, i.e., if the target-gear-position clutch is still partly engaged, control goes to steps S36 through S40 in which an engagement decision timer $T_{FC}$ is re-started, a predicted torque ETQ to be transferred is calculated, and a clutch pressure $P_{CL}$ (ETQ) necessary to produce the torque ETQ is established.

As shown in FIG. 19 at (A), the control pressure $P_{TH}$ is increased to $P_{TH}$(ETQ) at the time $t_4$, and the clutch pressure $P_{CL}$ thus becomes the hydraulic pressure $P_{CL}$ (ETQ) which produces a torque that is the same as the predicted torque ETQ. The input and output members of the target-gear-position clutch start being gradually engaged, and this clutch is engaged without causing a gearshift shock and engine racing.

If the input and output rotational speed ratio $e_{CLa}$ of the target-gear-position clutch becomes smaller than $e_{CIED}$, indicating that this clutch is substantially engaged, then control proceeds to a step S42 which waits for the time period (from a time $t_5$ to a time $t_6$) set by the engagement decision timer $T_{FC}$ to elapse. Thereafter, the target gear position Sa is set as the present gear position So in a step S44. In a next cycle, therefore, the step S6 determines that Sa=So, and then control goes to the step S8 in which the clutch pressure $P_{CL}$ is increased to its maximum pressure (clutch engaging pressure).

According to the present control process, when the condition $e_{CLa} \leq e_{CIED}$ (the target-gear-position clutch is engaged) continues for a period of time longer than the time set by the timer $T_{FC}$, the clutch pressure $P_{CL}$ is increased to its maximum value.

If $e_{CLo}>e_{CISD}$ in the step S28, i.e., if the target-gear-position clutch does not start to be disengaged and the input and output rotational speed ratio of the present-gear-position clutch does not start to vary upon elapse of the time counted by the time lag timer $T_{LAGL}$, and the condition $e_{CLo}>e_{CISD}$ still remains at a time $t_{13}$ after the elapse of the time counted by the time lag timer $T_{LAGL}$, as shown in FIG. 19 at (B), then the gearshift time lag tends to be excessively long. In this case, the steps S30 and S32 are not executed, and control goes directly to the step S34 and subsequent steps.

When this happens, as shown in FIG. 19 at (B), the control pressure $P_{TH}$ is immediately increased to $P_{TH}$ (ETQ) at the time $t_{13}$, so that the next-gear-position clutch starts to be engaged right away, thus preventing the time lag from becoming too long. The control process from the step S34 is the same as described above (FIG. 19 at (A), and will not be described below.

A gearshift in the power-off/upshift mode will be described below.

Figure 18A:
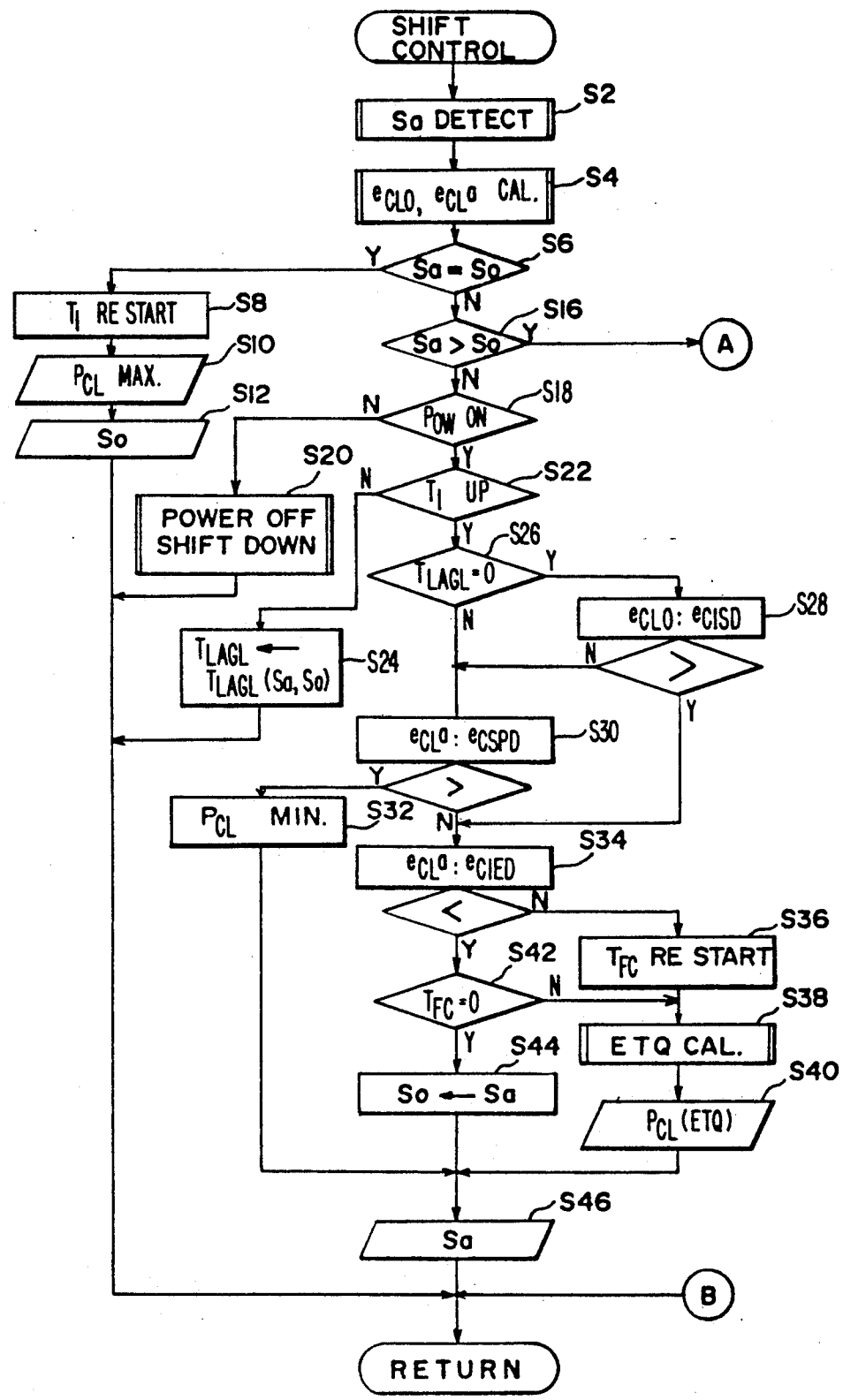
FIGS. 18A and 18B are flowcharts of a control sequence of the gearshift control apparatus shown in FIG. 17.
Figure 18B:
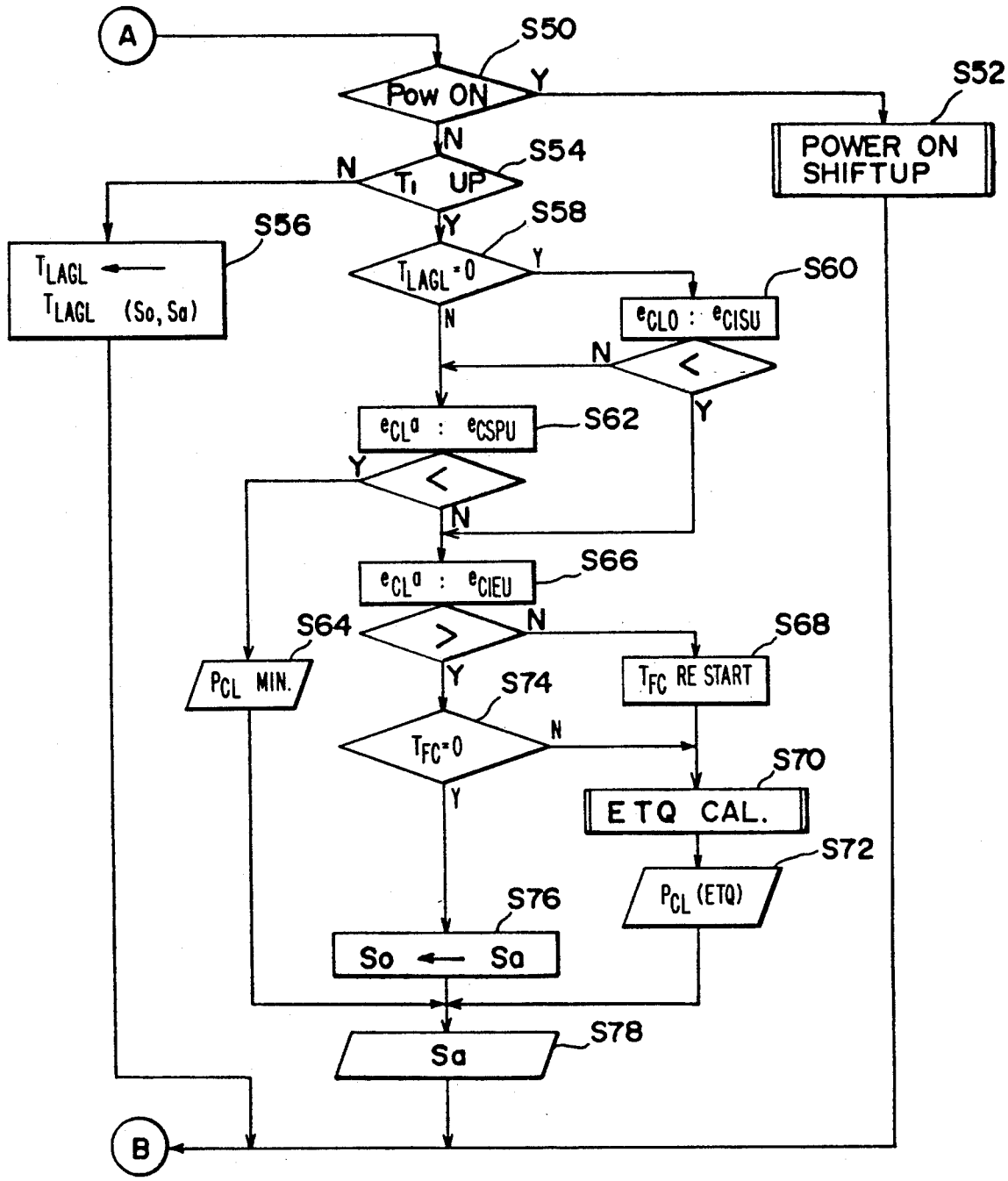

For an upshift, control goes from the step S16 in FIG. 18A to a step S50 in FIG. 18B. The step S50 determines the engine is in the power-on condition or not. If in the power-on condition, control goes to a step S52 which effects a gearshift in the power-on/upshift mode. The power-on/upshift mode will not be described as it has no direct bearing on this control process.

If in the power-off/upshift mode, control goes to a step S54 which waits for the elapse of a time set by the gearshift decision timer $T_1$ from the time the gearshift command has been issued. Control then goes from the step S54 to a step S58. Before the elapse of the time set by the gearshift decision timer $T_1$, a time lag timer $T_{LAGL}$ is set according to the gear positions So, Sa in this gearshift in a step S56.

As shown in FIG. 20, if a gearshift command for a gearshift from the present gear position So to the target gear position Sa is issued at the time $t_{21}$, then the shift solenoid output changes from So to Sa at a time $t_{22}$ upon elapse of the time set by the gearshift decision timer $T_1$.

The time starts being counted by the time lag timer $T_{LAGL}$ from the time $t_{22}$. When the time counted by the time lag timer $T_{LAGL}$ elapses, a step S60 determines whether the input and output rotational speed ratio $e_{CLo}$ of the present-gear-position clutch is larger than a gearshift start decision value $e_{CISU}$. The gearshift start decision value $e_{CISU}$ is slightly larger than 1.0. In the power-off/upshift mode, the input and output rotational speed $e_{CLo}$ varies so as to be larger than 1.0. Therefore, if $e_{CLo} < e_{CISU}$, then the present-gear-position clutch is still engaged, and if $e_{CLo} \geq e_{CISU}$, then this clutch starts being disengaged.

If $e_{CLo} \geq e_{CISU}$ in the step S60, that is, if the target-gear-position clutch starts being disengaged and the input and output rotational speed ratio of the present-gear-position clutch starts to vary until the time counted by the time lag timer $T_{LAGL}$ elapses, and the condition $e_{CLo} \geq e_{CISU}$ is reached when the time counted by the time lag timer $T_{LAGL}$ elapses, then the gearshift time lag will not be excessively long, and control goes to a step S62. The step S62 determines whether the input and output rotational speed ratio $e_{CLa}$ of the target-gear-position clutch is larger than a predetermined value $e_{CSPU}$. If $e_{CLa} > e_{CSPU}$, that is, if the input and output rotational speed ratio $e_{CLa}$ of the target-gear-position clutch has not yet reached the predetermined value $e_{CSPU}$, then the clutch pressure $P_{CL}$ is set to a minimum value in a step S64.

When the clutch pressure $P_{CL}$ is minimum, the target-gear-position clutch is not engaged. Since the engine is in the power-off condition, the engine rotational speed quickly decreases, and so does the input rotational speed of the target-gear-position clutch. The input and output rotational speed ratio $e_{CLa}$ of this clutch is quickly increased toward 1.0.

If the condition $e_{CLa} \geq e_{CSPU}$, then control goes from the step S62 to a step S66 which determines whether the rotational speed ratio $e_{CLa}$ becomes larger than an engagement completion decision value $e_{CIEU}$ slightly smaller than 1.0, i.e., whether the target-gear-position clutch is substantially engaged or not. If $e_{CLa} \leq e_{CIEU}$, then control goes to steps S68 through S72 in which an engagement decision timer $T_{FC}$ is re-started, a predicted torque ETQ to be transferred is calculated, and a clutch pressure $P_{CL}$ (ETQ) necessary to produce the torque ETQ is established.

If the input and output rotational speed ratio $e_{CLa}$ of the target-gear-position clutch becomes larger than $e_{CIEU}$, indicating that this clutch is substantially engaged, then control proceeds to a step S74 which waits for the time period set by the engagement decision timer $T_{FC}$ to elapse. Thereafter, the target gear position Sa is set as the present gear position So in a step S76. In a next cycle, therefore, the step S6 (FIG. 18A) determines that Sa=So, and then control goes to the step S8 in which the clutch pressure $P_{CL}$ is increased to its maximum pressure (clutch engaging pressure).

If $e_{CLo} < e_{CISU}$ in the step S60, i.e., if the target-gear-position clutch does not start to be disengaged and the input and output rotational speed ratio of the present-gear-position clutch does not start to vary upon elapse of the time counted by the time lag timer $T_{LAGL}$, and the condition $e_{CLo} < e_{CISU}$ still remains at a time $t_{23}$ after the elapse of the time counted by the time lag timer $T_{LAGL}$, as shown in FIG. 20, then the gearshift time lag tends to be excessively long. In this case, the steps S62 and S64 are not executed, and control goes directly to the step S66 and subsequent steps.

When this happens, as shown in FIG. 20, the control pressure $P_{TH}$ is immediately increased to $P_{TH}$ (ETQ) at the time $t_{23}$, so that the next-gear-position clutch starts to be engaged right away, thus preventing the time lag from becoming too long.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gearshift control apparatus for an automatic transmission having power transmitting means providing a plurality of power transmission paths, and a plurality of gearshift means engageable and disengageable to select one of said power transmission paths at a time, said gearshift control apparatus comprising:

engaging force setting means for setting a plurality of gearshift modes according to an accelerator pedal condition and a gearshift type when a gearshift is to be effected and for setting engaging forces for the gearshift means according to the shift modes when the gearshift is to be effected wherein said gearshift modes include a mode (SYU mode) in which the gearshift type is an upshift and the accelerator pedal condition is a power-off condition, a mode (SYD mode) in which the gearshift type is a downshift and the accelerator pedal condition is a power-on condition, a mode (IPU mode) in which the gearshift type is an upshift and the accelerator pedal condition is a power-on condition, and a mode (IPD or EPD mode) in which the gearshift type is a downshift and the accelerator pedal condition is a power-off, and condition said engaging forces being determined based on at least a calculated engine torque (ETQ).

2. A gearshift control apparatus according to claim 1, wherein said engaging force setting means comprises means for setting engaging forces for the gearshift means based on a calculated engine torque (ETQ) transmitted from an engine to the gearshift means and an inertia torque (ITQ) required to cause the input rotational speed of the gearshift means to vary according to desired characteristics for the gearshift, if the gearshift modes include a mode (IPU mode) in which the gearshift type is an upshift and the accelerator pedal condition is a power-on condition, and a mode (IPD or EPD mode) in which the gearshift type is a downshift and the accelerator pedal condition is a power-off condition.

3. A gearshift control apparatus according to claim 1, further including means for detecting the rotational speed ratio of input and output members of said gearshift means, wherein said engaging force setting means comprises means for setting engaging forces to a low level until the rotational speed ratio reaches a predetermined value, and for setting engaging forces to a value increased to a level high enough to engage the gearshift means after the rotational speed ratio has reached said predetermined value, if the gearshift modes include a mode (SYD mode) in which the gearshift type is a downshift and the accelerator pedal condition is a power-on condition, and a mode (SYU mode) in which the gearshift type is an upshift and the accelerator pedal condition is a power-off condition.

4. A gearshift control apparatus according to claim 1, wherein said gearshift means comprise hydraulically operated clutches, said engaging force setting means comprises means for controlling a hydraulic pressure to be supplied to the hydraulically operated clutches to set said engaging forces.

5. A gearshift control apparatus according to claim 4, wherein said engaging force setting means comprises a linear solenoid for controlling said hydraulic pressure in response to an electric current supplied thereto.

6. A gearshift control apparatus according to claim 1, further including synchronized rotation detecting means for determining synchronization of the rotational speeds of input and output rotatable members of the gearshift means by detecting when the relative rotational speed of said input and output rotatable members is substantially equal to zero, and torque predicting means for predicting a torque which would be transmitted through the gearshift means if said gearshift means were completely engaged, when said gearshift means are not engaged, wherein, if said gearshift modes include a mode (SYD mode) in which the gearshift type is a downshift and the accelerator pedal condition is a power-on condition, said engaging force setting means comprises means for setting the engaging forces for said gearshift means to an engaging force corresponding to a torque predicted by said torque predicting means during a prescribed period of time until the synchronization of the rotational speeds of the input and output rotatable members of the gearshift means is determined by said synchronized rotation detecting means, and for increasing the engaging forces up to a predetermined engaging force after the synchronization of the rotational speeds has been determined.

7. A gearshift control apparatus according to claim 6, wherein said relative rotational speed is substantially equal to zero when it is detected that the rotational speed ratio of the input and output rotatable members of said gearshift means is substantially 1.0.

8. A gearshift control apparatus according to claim 6 or 7, wherein said synchronized rotation detecting means comprises means for determining that the rotational speeds of the input and output rotatable members of the gearshift means are synchronized when it is detected that the relative rotational speed which is substantially equal to zero has continued over a predetermined period of time.

9. A gearshift control apparatus according to claim 6, wherein said torque predicting means comprises means for predicting the torque based on an engine output torque depending on an engine throttle opening and an engine rotational speed at the time.

10. A gearshift control apparatus according to claim 6, wherein said torque predicting means comprises means for predicting the torque based on a value approximate to an engine torque calculated by multiplying a value indicating an engine throttle opening at the time by a predetermined coefficient.

11. A gearshift control apparatus according to claim 1, further including throttle opening detecting means for detecting an engine throttle opening, and torque predicting means for predicting a torque which would be transmitted through the gearshift means if said gearshift means were completely engaged, when said gearshift means are not engaged, wherein, if said gearshift modes include a mode (SYU mode) in which the gearshift type is an upshift and the accelerator pedal condition is a power-off condition, said engaging force setting means comprises means for minimizing the engaging forces for said gearshift means when a command for effecting a gearshift in said mode (SYU mode) is issued, for setting the engaging forces for said gearshift means to a predetermined engaging force when the rotational speed ratio of input and output rotatable members of said gearshift means reaches a predetermined value, and for modifying the engaging forces for the gearshift means into an engaging force corresponding to the torque predicted by said torque predicting means when the engine throttle opening detected by said throttle opening detecting means becomes a predetermined opening while the gearshift is being effected in said mode (SYU mode).

12. A gearshift control apparatus according to claim 11, wherein said torque predicting means comprises means for predicting the torque based on an engine output torque depending on an engine throttle opening and an engine rotational speed at the time.

13. A gearshift control apparatus according to claim 11, wherein said torque predicting means comprises means for predicting the torque based on a value approximate to an engine torque calculated by multiplying a value indicating an engine throttle opening at the time by a predetermined coefficient.

14. A gearshift control apparatus according to claim 1, including rotational speed ratio detecting means for detecting the rotational speed ratio of input and output rotatable members of the gearshift means, and allowable time lag setting means for setting an allowable time lag from the time when an output is issued to effect a gearshift in either a mode (SYD mode) in which the gearshift type is a downshift and the accelerator pedal condition is a power-on condition or a mode (SYU mode) in which the gearshift type is an upshift and the accelerator pedal condition is a power-off condition, to the time said rotational speed ratio starts to vary, wherein, when the gearshift is effected in either of said modes, said engaging force setting means comprises means for minimizing the engaging forces for said gearshift means when a command to effect said gearshift is issued, for setting the engaging forces for said gearshift means to a predetermined engaging force when the rotational speed ratio detected by said rotational speed ratio detecting means reaches a predetermined value, and for increasing the engaging forces for the gearshift means upon elapse of said allowable time lag if said rotational speed ratio detected by said rotational speed ratio detecting means does not start to vary from the time when the output to effect said gearshift is issued until the allowable time lag set by said allowable time lag setting means elapses.

* * * * *